(12) United States Patent
Muthusamy et al.

(10) Patent No.: US 12,081,979 B2
(45) Date of Patent: Sep. 3, 2024

(54) ONE-TIME WIRELESS AUTHENTICATION OF AN INTERNET-OF-THINGS DEVICE

(71) Applicant: Visa International Service Association, San Francisco, CA (US)

(72) Inventors: Krishnaram Muthusamy, Austin, TX (US); Robert Chifamba, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 598 days.

(21) Appl. No.: 17/090,385

(22) Filed: Nov. 5, 2020

(65) Prior Publication Data
US 2022/0141658 A1    May 5, 2022

(51) Int. Cl.
  *H04W 12/06*  (2021.01)
  *H04L 9/40*   (2022.01)
  (Continued)

(52) U.S. Cl.
  CPC ....... *H04W 12/068* (2021.01); *H04L 63/0884* (2013.01); *H04L 63/10* (2013.01); *H04W 12/084* (2021.01); *H04W 12/71* (2021.01)

(58) Field of Classification Search
  None
  See application file for complete search history.

(56) References Cited

U.S. PATENT DOCUMENTS 6,600,915 B1 * 7/2003 Wedeking ............... H04L 67/04
                                                726/28
7,213,143 B1 * 5/2007 Watson ............... H04L 63/0884
                                                713/166
(Continued)

FOREIGN PATENT DOCUMENTS

CN    105472699 B    4/2016
EP    3410675 B1     8/2020
(Continued)

OTHER PUBLICATIONS

Song et al "One-Time Key Authentication Protocol for PMIPv6," Third 2008 International Conference on Convergence and Hybrid Information Technology, IEEE Computer Society pp. 1150-1153 (Year: 2008).*

(Continued)

*Primary Examiner* — Luu T Pham
*Assistant Examiner* — James J Wilcox
(74) *Attorney, Agent, or Firm* — Schwabe Williamson & Wyatt, PC

(57) ABSTRACT

Authentication of an Internet-of-Things (IoT) device comprises receiving, by a proxy application executing on a mobile device during a registration process, a device identifier associated with the IoT device. The proxy application transmits the device identifier to a router of the wireless network. The proxy application receives the device identifier from the router in response to the router receiving an authorization request with no network password from the IoT device for access to the wireless network, where the router forwards the device identifier to the proxy application. The proxy application prompts the user of the mobile device to enter the password, and transmits the entered network password to the router, such that the router validates the password and grants the IoT device access to the wireless network, the IoT device transmits the IoT device identifier to the router for subsequent network connection without a need for the mobile device.

12 Claims, 8 Drawing Sheets

(51) Int. Cl.
*H04W 12/084* (2021.01)
*H04W 12/71* (2021.01)

(56) References Cited

U.S. PATENT DOCUMENTS

| | | | | |
|---|---|---|---|---|
| 7,587,499 | B1* | 9/2009 | Haghpassand | H04L 63/0281 |
| | | | | 709/227 |
| 7,958,347 | B1* | 6/2011 | Ferguson | H04L 9/321 |
| | | | | 726/8 |
| 8,201,232 | B2* | 6/2012 | Zhang | G06F 21/31 |
| | | | | 380/270 |
| 8,341,708 | B1* | 12/2012 | Eatough | G06F 21/33 |
| | | | | 726/5 |
| 8,468,609 | B2* | 6/2013 | Leggette | H04L 63/10 |
| | | | | 709/216 |
| 8,661,246 | B1* | 2/2014 | Hoech | H04L 9/3263 |
| | | | | 713/168 |
| 8,700,729 | B2* | 4/2014 | Dua | G06Q 20/40 |
| | | | | 705/64 |
| 8,769,044 | B2* | 7/2014 | Carlander | H04W 80/12 |
| | | | | 709/227 |
| 8,966,260 | B1* | 2/2015 | Walter | H04L 63/029 |
| | | | | 713/168 |
| 8,984,597 | B2* | 3/2015 | Hatlelid | H04L 67/142 |
| | | | | 726/8 |
| 9,047,451 | B2* | 6/2015 | Brown | G06F 3/0482 |
| 9,130,952 | B2* | 9/2015 | Colclasure | G06F 16/14 |
| 9,210,167 | B1* | 12/2015 | Lafuente | H04L 63/0838 |
| 9,231,904 | B2* | 1/2016 | Johnson | H04L 41/0803 |
| 9,235,839 | B2 | 1/2016 | Dua | |
| 9,253,639 | B1* | 2/2016 | Lafuente | H04W 12/06 |
| 9,299,053 | B2* | 3/2016 | Gazdzinski | G06Q 20/204 |
| 9,338,155 | B2* | 5/2016 | Quach | H04L 9/3215 |
| 9,378,356 | B2* | 6/2016 | Rockwell | H04L 63/0846 |
| 9,413,756 | B1* | 8/2016 | Wang | G06F 21/31 |
| 9,425,954 | B1* | 8/2016 | Chalker | H04L 9/0816 |
| 9,438,576 | B2* | 9/2016 | Franca-Neto | H04L 63/08 |
| 9,584,482 | B2* | 2/2017 | Burns | H04L 12/6418 |
| 9,621,495 | B1* | 4/2017 | Shumate | H04L 51/046 |
| 9,641,525 | B2* | 5/2017 | Kall | H04L 63/0876 |
| 9,699,192 | B2* | 7/2017 | John | G06F 21/6218 |
| 9,712,486 | B2* | 7/2017 | Johnson | H04W 12/35 |
| 9,722,803 | B1* | 8/2017 | Ellingson | H04L 9/30 |
| 9,729,537 | B2* | 8/2017 | McBride | H04L 63/062 |
| 9,730,060 | B2* | 8/2017 | Kim | H04W 8/18 |
| 9,762,564 | B1* | 9/2017 | Angelov | H04W 12/08 |
| 9,794,965 | B1* | 10/2017 | Yu | H04L 67/12 |
| 9,807,092 | B1* | 10/2017 | Gutzmann | H04L 63/20 |
| 9,838,390 | B2* | 12/2017 | Zakaria | H04W 4/70 |
| 9,843,624 | B1* | 12/2017 | Taaghol | H04L 41/0895 |
| 9,888,070 | B2* | 2/2018 | McGregor | H04L 67/1068 |
| 9,898,474 | B1* | 2/2018 | Sorenson, III | H04L 63/0428 |
| 9,986,038 | B2* | 5/2018 | Wang | H04L 67/125 |
| 9,998,334 | B1* | 6/2018 | Yu | G06F 9/454 |
| 10,057,269 | B1* | 8/2018 | Ellingson | H04L 63/101 |
| 10,075,531 | B2* | 9/2018 | Chandwani | H04L 67/141 |
| 10,083,442 | B1* | 9/2018 | Quigley | G06Q 20/326 |
| 10,089,488 | B2* | 10/2018 | Wong | G06F 16/951 |
| 10,104,077 | B1* | 10/2018 | Irwan | G06F 21/45 |
| 10,135,835 | B1* | 11/2018 | Kandel | H04L 9/0637 |
| 10,136,322 | B2* | 11/2018 | Rougier | H04L 9/3297 |
| 10,200,377 | B1* | 2/2019 | Vazquez | H04L 63/102 |
| 10,218,708 | B1* | 2/2019 | Butler | H04L 63/10 |
| 10,250,612 | B1* | 4/2019 | Raposa | H04L 63/108 |
| 10,257,179 | B1* | 4/2019 | Saylor | H04W 12/068 |
| 10,270,774 | B1* | 4/2019 | Berman | H04W 12/06 |
| 10,299,118 | B1* | 5/2019 | Karachiwala | H04L 67/55 |
| 10,320,569 | B1* | 6/2019 | Wentz | H04L 9/3239 |
| 10,324,745 | B2* | 6/2019 | Tse | G06F 9/45558 |
| 10,341,814 | B2* | 7/2019 | Thoresen | H04W 12/068 |
| 10,367,794 | B2* | 7/2019 | Sayers | H04L 9/0894 |
| 10,411,894 | B1* | 9/2019 | Yavnilovich | H04W 12/06 |
| 10,417,454 | B2* | 9/2019 | Marom | G06F 21/57 |
| 10,419,226 | B2* | 9/2019 | Ellingson | H04L 63/061 |
| 10,439,868 | B2* | 10/2019 | Lim | H04W 12/08 |
| 10,440,028 | B1* | 10/2019 | Makmel | H04L 63/0861 |
| 10,498,611 | B1* | 12/2019 | Kloberdans | H04L 41/40 |
| 10,523,672 | B2 | 12/2019 | Zakaria | |
| 10,523,674 | B2* | 12/2019 | Ylönen | H04L 63/08 |
| 10,546,139 | B2* | 1/2020 | Ellingson | G06F 16/178 |
| 10,554,758 | B2* | 2/2020 | Barry | G07C 9/00571 |
| 10,601,837 | B1* | 3/2020 | Sharma | G06F 21/604 |
| 10,623,446 | B1* | 4/2020 | Stoler | H04L 63/101 |
| 10,637,724 | B2* | 4/2020 | Johnson | H04L 41/0803 |
| 10,664,543 | B2* | 5/2020 | Cypher | G06F 3/04847 |
| 10,693,872 | B1* | 6/2020 | Larson | H04L 9/3231 |
| 10,708,338 | B2* | 7/2020 | Dingwell | G06F 21/10 |
| 10,721,590 | B2* | 7/2020 | Thoresen | H04W 4/12 |
| 10,742,744 | B1* | 8/2020 | Mahalank | H04L 43/065 |
| 10,764,056 | B2* | 9/2020 | Senyuk | H04L 9/3234 |
| 10,868,836 | B1* | 12/2020 | Yancey | H04L 63/0227 |
| 10,887,157 | B1* | 1/2021 | Fletcher | H04L 41/0622 |
| 10,902,852 | B2* | 1/2021 | Tran | G06F 21/32 |
| 10,909,582 | B1* | 2/2021 | Brandt | G06Q 20/4014 |
| 10,924,484 | B2* | 2/2021 | Lelcuk | H04L 9/0637 |
| 10,936,643 | B1* | 3/2021 | Alspaugh | G06F 16/951 |
| 10,963,583 | B1* | 3/2021 | Shimony | G06F 21/577 |
| 10,985,970 | B1* | 4/2021 | Goyal | G06F 16/2477 |
| 10,992,678 | B1* | 4/2021 | Gilman | H04L 63/10 |
| 10,999,164 | B1* | 5/2021 | Sridhar | H04L 12/4633 |
| 11,023,511 | B1* | 6/2021 | Fletcher | G06F 16/338 |
| 11,057,491 | B1* | 7/2021 | Bijon | G06F 21/31 |
| 11,080,096 | B1* | 8/2021 | Fakhouri | G06F 9/5072 |
| 11,089,105 | B1* | 8/2021 | Karumbunathan | G06F 16/275 |
| 11,093,518 | B1* | 8/2021 | Lu | G06F 11/3476 |
| 11,102,190 | B2* | 8/2021 | Lelcuk | H04L 63/1466 |
| 11,106,442 | B1* | 8/2021 | Hsiao | H04L 67/02 |
| 11,133,962 | B2* | 9/2021 | Hassan | H04L 12/2827 |
| 11,153,298 | B1* | 10/2021 | Eshun | H04L 63/0823 |
| 11,171,950 | B1* | 11/2021 | Zhuravlev | H04L 67/1097 |
| 11,184,766 | B1* | 11/2021 | Lord | G06V 10/75 |
| 11,218,300 | B1* | 1/2022 | Shea | H04L 9/0897 |
| 11,218,301 | B1* | 1/2022 | Shea | H04L 9/0827 |
| 11,218,324 | B2* | 1/2022 | Wentz | H04L 9/088 |
| 11,218,471 | B1* | 1/2022 | Stapleton | H04L 63/061 |
| 11,223,470 | B1* | 1/2022 | Shea | G06F 21/64 |
| 11,240,014 | B1* | 2/2022 | Maganti | H04L 9/002 |
| 11,240,223 | B1* | 2/2022 | Stapleton | H04L 63/0823 |
| 11,245,519 | B1* | 2/2022 | Stapleton, Jr. | H04L 9/0858 |
| 11,245,577 | B2* | 2/2022 | Behm | H04L 41/12 |
| 11,258,861 | B2* | 2/2022 | Dewan | H04L 67/142 |
| 11,316,693 | B2* | 4/2022 | Telfer | H04L 9/20 |
| 11,322,050 | B1* | 5/2022 | Arbajian | G09C 1/00 |
| 11,336,511 | B2* | 5/2022 | Johnson | H04W 12/06 |
| 11,343,270 | B1* | 5/2022 | Carter, Jr. | H04L 9/088 |
| 11,356,247 | B1* | 6/2022 | Carter, Jr. | H04L 9/0852 |
| 11,366,842 | B1* | 6/2022 | Swaminathan | G06F 16/2477 |
| 11,394,551 | B2* | 7/2022 | Hassan | H04L 9/3226 |
| 11,395,139 | B1* | 7/2022 | Paczkowski | H04W 12/12 |
| 11,416,865 | B2* | 8/2022 | Awasthi | G06Q 20/3821 |
| 11,449,799 | B1* | 9/2022 | Arbajian | H04L 9/0891 |
| 11,477,016 | B1* | 10/2022 | Carter, Jr. | G06F 21/577 |
| 11,533,175 | B1* | 12/2022 | Rao | G06N 20/00 |
| 11,552,793 | B1* | 1/2023 | Shea | H04L 63/166 |
| 11,601,266 | B1* | 3/2023 | Stapleton | G06N 10/00 |
| 11,626,983 | B1* | 4/2023 | Carter, Jr. | G06F 16/2219 |
| | | | | 380/28 |
| 11,652,632 | B2* | 5/2023 | Palanisamy | H04L 9/3213 |
| | | | | 713/159 |
| 11,663,510 | B1* | 5/2023 | Carter, Jr. | H04L 63/08 |
| | | | | 257/31 |
| 11,716,617 | B2* | 8/2023 | Wentz | H04L 63/0807 |
| | | | | 713/168 |
| 11,816,612 | B1* | 11/2023 | Maurya | H04L 41/147 |
| 11,838,410 | B1* | 12/2023 | Ramanathan | H04L 9/0861 |
| 11,895,232 | B1* | 2/2024 | Stapleton | G06N 10/00 |
| 2002/0156906 | A1* | 10/2002 | Kadyk | H04L 63/029 |
| | | | | 709/229 |
| 2003/0187993 | A1* | 10/2003 | Ribot | G06F 21/604 |
| | | | | 709/227 |
| 2004/0216128 | A1* | 10/2004 | Elzbieta | H04L 9/40 |
| | | | | 719/313 |
| 2005/0114531 | A1 | 5/2005 | Kadyk | |

(56) References Cited

U.S. PATENT DOCUMENTS

| | | | | |
|---|---|---|---|---|
| 2005/0170813 A1* | 8/2005 | Choi | H04W 12/126 | 455/410 |
| 2005/0246243 A1* | 11/2005 | Adams | G06F 21/10 | 705/64 |
| 2006/0165060 A1* | 7/2006 | Dua | G06Q 20/401 | 705/76 |
| 2007/0011452 A1* | 1/2007 | Marquet | H04L 63/105 | 713/168 |
| 2007/0179794 A1* | 8/2007 | Fisher | H04L 63/083 | 726/4 |
| 2007/0282201 A1* | 12/2007 | Kim | G06F 16/9554 | 707/E17.031 |
| 2008/0301057 A1* | 12/2008 | Oren | G06Q 20/4012 | 705/72 |
| 2009/0013177 A1* | 1/2009 | Lee | G06F 21/10 | 713/158 |
| 2009/0025070 A1* | 1/2009 | Netanel | H04W 12/08 | 726/5 |
| 2009/0113536 A1* | 4/2009 | Zhang | H04L 63/102 | 726/12 |
| 2009/0172793 A1* | 7/2009 | Newstadt | G06F 21/31 | 726/5 |
| 2009/0249443 A1* | 10/2009 | Fitzgerald | H04L 63/10 | 726/2 |
| 2009/0249460 A1* | 10/2009 | Fitzgerald | H04L 63/12 | 709/206 |
| 2009/0253407 A1* | 10/2009 | Sigmund | H04W 4/16 | 455/410 |
| 2010/0005516 A1* | 1/2010 | Alberti | H04L 63/102 | 726/6 |
| 2010/0031369 A1* | 2/2010 | Grummt | H04L 61/30 | 726/26 |
| 2010/0100735 A1* | 4/2010 | Rajan | H04W 12/068 | 713/168 |
| 2010/0192217 A1* | 7/2010 | Arnold | H04L 63/30 | 726/13 |
| 2010/0269156 A1* | 10/2010 | Hohlfeld | H04L 9/321 | 726/4 |
| 2010/0325719 A1* | 12/2010 | Etchegoyen | H04L 69/40 | 726/15 |
| 2011/0040888 A1* | 2/2011 | Krishnaswamy | H04W 76/14 | 709/231 |
| 2011/0092185 A1* | 4/2011 | Garskof | H04L 63/083 | 455/411 |
| 2012/0160912 A1* | 6/2012 | Laracey | H04W 12/069 | 235/379 |
| 2012/0179787 A1* | 7/2012 | Walsh | H04L 63/0281 | 709/219 |
| 2013/0055362 A1* | 2/2013 | Rathbun | H04L 63/18 | 726/5 |
| 2013/0065557 A1* | 3/2013 | Zhang | H04W 12/04 | 455/411 |
| 2013/0312091 A1* | 3/2013 | Merchant | H04L 63/0853 | 726/20 |
| 2013/0086657 A1* | 4/2013 | Srinivasan | H04L 9/3234 | 726/6 |
| 2013/0191885 A1* | 7/2013 | Hubner | H04L 41/5061 | 709/217 |
| 2013/0206835 A1* | 8/2013 | Gazdzinski | G07B 17/00314 | 235/380 |
| 2013/0212248 A1* | 8/2013 | Neafsey | H04W 12/35 | 709/223 |
| 2013/0339509 A1* | 12/2013 | Johnson | H04L 41/0803 | 709/223 |
| 2014/0040993 A1* | 2/2014 | Lorenzo | G06F 21/6236 | 726/4 |
| 2014/0049370 A1* | 2/2014 | Eberwine | H04L 63/18 | 340/5.61 |
| 2014/0123265 A1 | 5/2014 | Borzycki | | |
| 2014/0143826 A1* | 5/2014 | Sharp | H04L 63/20 | 726/1 |
| 2014/0165165 A1* | 6/2014 | Story, Jr. | H04W 12/0431 | 726/6 |
| 2014/0196129 A1* | 7/2014 | Amin | H04L 63/08 | 726/6 |
| 2014/0244834 A1* | 8/2014 | Guedalia | H04W 4/08 | 709/224 |
| 2014/0298405 A1* | 10/2014 | Qureshi | H04L 67/02 | 726/1 |
| 2014/0331295 A1* | 11/2014 | Kumar | H04L 63/0807 | 726/6 |
| 2014/0373170 A1* | 12/2014 | Brudnicki | G06F 21/604 | 726/27 |
| 2015/0089619 A1* | 3/2015 | Manza | H04L 63/0815 | 726/8 |
| 2015/0113172 A1* | 4/2015 | Johnson | H04L 67/75 | 709/245 |
| 2015/0121498 A1* | 4/2015 | Burch | H04L 63/08 | 726/7 |
| 2015/0132984 A1* | 5/2015 | Kim | H04L 63/0838 | 439/345 |
| 2015/0186642 A1* | 7/2015 | Cruz Mota | G06F 21/554 | 726/23 |
| 2015/0186931 A1* | 7/2015 | Flake | G06Q 30/0247 | 705/14.46 |
| 2015/0230277 A1* | 8/2015 | O'Meara | H04W 76/10 | 455/411 |
| 2015/0249672 A1* | 9/2015 | Burns | G06F 21/629 | 726/4 |
| 2015/0312250 A1* | 10/2015 | Redberg | H04L 9/30 | 726/6 |
| 2015/0312953 A1* | 10/2015 | Wang | H04L 1/1864 | 370/312 |
| 2015/0350913 A1* | 12/2015 | Eberwine | H04W 12/041 | 455/411 |
| 2015/0365412 A1* | 12/2015 | Innes | H04L 63/12 | 726/7 |
| 2015/0381580 A1* | 12/2015 | Graham, III | H04L 63/20 | 713/168 |
| 2015/0381776 A1* | 12/2015 | Seed | H04L 5/0055 | 709/203 |
| 2016/0026983 A1* | 1/2016 | Lindsley | G06Q 30/0635 | 705/26.81 |
| 2016/0066183 A1* | 3/2016 | Conant | H04L 63/0853 | 726/6 |
| 2016/0087933 A1* | 3/2016 | Johnson | H04L 41/08 | 709/245 |
| 2016/0087964 A1* | 3/2016 | Irving, Jr. | H04L 63/12 | 726/4 |
| 2016/0112434 A1* | 4/2016 | Chung | H04L 63/0807 | 726/4 |
| 2016/0124742 A1* | 5/2016 | Rangasamy | H04L 41/00 | 717/103 |
| 2016/0127895 A1* | 5/2016 | Bangole | H04W 4/48 | 380/279 |
| 2016/0164840 A1* | 6/2016 | Robertson | H04L 63/10 | 726/12 |
| 2016/0171479 A1 | 6/2016 | Prakash | | |
| 2016/0182228 A1* | 6/2016 | Smith | H04L 9/0841 | 713/171 |
| 2016/0182518 A1* | 6/2016 | Smith | H04L 63/045 | 726/3 |
| 2016/0205078 A1* | 7/2016 | James | H04L 9/006 | 713/171 |
| 2016/0205097 A1* | 7/2016 | Yacoub | H04L 61/4511 | 726/6 |
| 2016/0205106 A1* | 7/2016 | Yacoub | H04W 12/041 | 726/28 |
| 2016/0212113 A1* | 7/2016 | Banerjee | H04W 12/06 | |
| 2016/0212141 A1* | 7/2016 | Banerjee | H04L 63/0846 | |
| 2016/0226914 A1* | 8/2016 | Doddy | G06F 21/45 | |
| 2016/0234209 A1* | 8/2016 | Kahol | H04L 63/08 | |
| 2016/0234628 A1* | 8/2016 | Rahman | H04W 12/50 | |
| 2016/0253651 A1* | 9/2016 | Park | G06Q 20/34 | 705/39 |
| 2016/0259923 A1* | 9/2016 | Papa | H04W 12/35 | |
| 2016/0285891 A1* | 9/2016 | Byers | H04L 63/0884 | |

(56) References Cited

U.S. PATENT DOCUMENTS

| | | | |
|---|---|---|---|
| 2016/0294798 A1* | 10/2016 | Zarroli | H04L 63/0861 |
| 2016/0294828 A1* | 10/2016 | Zakaria | H04L 63/0876 |
| 2016/0315824 A1* | 10/2016 | Johnson | H04L 63/0281 |
| 2016/0323280 A1* | 11/2016 | Sade | H04L 63/0807 |
| 2016/0337328 A1* | 11/2016 | Sallam | H04L 63/08 |
| 2016/0337346 A1* | 11/2016 | Momchilov | G06F 21/34 |
| 2016/0353489 A1* | 12/2016 | Blanksby | H04W 76/16 |
| 2016/0364553 A1* | 12/2016 | Smith | H04L 63/0428 |
| 2017/0006009 A1* | 1/2017 | Hessler | G06F 21/316 |
| 2017/0012988 A1* | 1/2017 | Turgeman | H04W 12/122 |
| 2017/0013549 A1* | 1/2017 | Ou | H04W 48/16 |
| 2017/0019387 A1* | 1/2017 | Ylonen | H04L 63/0435 |
| 2017/0034174 A1* | 2/2017 | Jägers | H04L 67/01 |
| 2017/0041316 A1* | 2/2017 | Setchell | H04W 12/50 |
| 2017/0054594 A1* | 2/2017 | Decenzo | H04L 69/18 |
| 2017/0063566 A1* | 3/2017 | Seminario | H04L 67/12 |
| 2017/0063843 A1* | 3/2017 | Vijayasankar | H04L 63/0428 |
| 2017/0063940 A1* | 3/2017 | Lapidous | H04L 63/10 |
| 2017/0086069 A1* | 3/2017 | Liu | H04L 9/3213 |
| 2017/0093700 A1* | 3/2017 | Gilley | H04L 45/44 |
| 2017/0093877 A1* | 3/2017 | Ganda | G06F 21/53 |
| 2017/0094509 A1* | 3/2017 | Mistry | H04W 4/40 |
| 2017/0110910 A1* | 4/2017 | Zeine | H02J 7/00047 |
| 2017/0124562 A1* | 5/2017 | Hessler | G06Q 20/386 |
| 2017/0169234 A1* | 6/2017 | Camiel | H04L 67/1097 |
| 2017/0169424 A1* | 6/2017 | Maddocks | G06Q 20/3821 |
| 2017/0171176 A1* | 6/2017 | Angaluri | G06F 21/57 |
| 2017/0171209 A1* | 6/2017 | Licklider | G06F 21/31 |
| 2017/0180208 A1* | 6/2017 | Smith | H04L 41/5054 |
| 2017/0180567 A1* | 6/2017 | Sharma | H04M 15/00 |
| 2017/0187723 A1* | 6/2017 | Islam | H04L 63/1433 |
| 2017/0208054 A1* | 7/2017 | Hanay | H04L 63/06 |
| 2017/0208057 A1* | 7/2017 | Wang | H04L 63/083 |
| 2017/0223807 A1* | 8/2017 | Recker | H02J 7/34 |
| 2017/0228182 A1* | 8/2017 | Novak | H04L 63/08 |
| 2017/0230832 A1* | 8/2017 | Ophir | H04W 12/06 |
| 2017/0236179 A1* | 8/2017 | Dreifus | H04M 15/8022 705/26.63 |
| 2017/0237609 A1* | 8/2017 | Yin | H04L 67/1095 709/222 |
| 2017/0237770 A1* | 8/2017 | Meriac | H04L 67/12 726/23 |
| 2017/0251026 A1* | 8/2017 | Straub | H04L 67/02 |
| 2017/0272316 A1* | 9/2017 | Johnson | H04L 61/301 |
| 2017/0272953 A1* | 9/2017 | Nathan | H04W 12/08 |
| 2017/0302669 A1* | 10/2017 | Chen | H04W 12/08 |
| 2017/0330191 A1* | 11/2017 | Pender | G06Q 20/3221 |
| 2017/0331815 A1* | 11/2017 | Pawar | H04L 63/0823 |
| 2017/0339561 A1* | 11/2017 | Wennemyr | H04W 64/00 |
| 2017/0353859 A1* | 12/2017 | Idnani | H04W 12/08 |
| 2017/0359237 A1* | 12/2017 | Hao | G06F 21/44 |
| 2017/0366969 A1* | 12/2017 | Syed | H04W 12/068 |
| 2018/0004933 A1* | 1/2018 | Nathanson | H04W 12/084 |
| 2018/0006883 A1* | 1/2018 | Melliere | H04L 67/34 |
| 2018/0013729 A1* | 1/2018 | Cooper | H04L 63/0428 |
| 2018/0014988 A1* | 1/2018 | Diaz-Flores | A61G 5/023 |
| 2018/0034682 A1* | 2/2018 | Gulati | H04L 9/3268 |
| 2018/0034822 A1* | 2/2018 | Mistry | H04W 12/37 |
| 2018/0039795 A1* | 2/2018 | Gulati | H04L 63/0823 |
| 2018/0041341 A1* | 2/2018 | Gulati | H04L 9/0894 |
| 2018/0054490 A1* | 2/2018 | Wadhwa | G08G 1/0129 |
| 2018/0076955 A1* | 3/2018 | Shields | H04L 63/06 |
| 2018/0083785 A1* | 3/2018 | Shields | H04W 12/033 |
| 2018/0089693 A1* | 3/2018 | Martin | H04M 7/0024 |
| 2018/0097639 A1* | 4/2018 | Gulati | H04L 9/3268 |
| 2018/0115554 A1* | 4/2018 | Dyon | H04L 63/164 |
| 2018/0115611 A1* | 4/2018 | Lear | H04L 41/28 |
| 2018/0121636 A1* | 5/2018 | Schiffman | G06F 21/34 |
| 2018/0145956 A1* | 5/2018 | Anglin | H04L 63/105 |
| 2018/0146378 A1* | 5/2018 | Christmas | H04W 4/80 |
| 2018/0152452 A1* | 5/2018 | Hu | H04W 12/08 |
| 2018/0176079 A1* | 6/2018 | Teo | H04W 52/0219 |
| 2018/0184290 A1* | 6/2018 | Luo | H04L 63/0442 |
| 2018/0212768 A1* | 7/2018 | Kawashima | H04L 63/0876 |
| 2018/0227842 A1* | 8/2018 | Chandramouli | H04W 12/065 |
| 2018/0232514 A1* | 8/2018 | Brown | H04L 63/107 |
| 2018/0247064 A1* | 8/2018 | Aronovich | G06F 16/24552 |
| 2018/0247385 A1* | 8/2018 | Whitfield | H04L 63/102 |
| 2018/0253544 A1* | 9/2018 | Ohsumi | H04L 63/0884 |
| 2018/0255066 A1* | 9/2018 | Gabriel | H04L 63/0846 |
| 2018/0260125 A1* | 9/2018 | Botes | G06F 16/275 |
| 2018/0260876 A1* | 9/2018 | Graham | H04L 9/32 |
| 2018/0262388 A1* | 9/2018 | Johnson | H04L 63/0823 |
| 2018/0270612 A1* | 9/2018 | Thoresen | G01S 1/02 |
| 2018/0284758 A1* | 10/2018 | Cella | G06N 3/088 |
| 2018/0287869 A1* | 10/2018 | Munafo | H04W 12/069 |
| 2018/0293389 A1* | 10/2018 | Mahaffey | H04L 63/166 |
| 2018/0309832 A1* | 10/2018 | Jain | H04L 67/34 |
| 2018/0316676 A1* | 11/2018 | Gilpin | H04L 9/0891 |
| 2018/0332040 A1* | 11/2018 | Chou | H04L 63/0853 |
| 2018/0338241 A1* | 11/2018 | Li | H04W 4/40 |
| 2018/0349482 A1* | 12/2018 | Oliner | G06F 16/38 |
| 2018/0351950 A1* | 12/2018 | Bao | H04L 63/0884 |
| 2018/0365309 A1* | 12/2018 | Oliner | G06F 9/542 |
| 2019/0012358 A1* | 1/2019 | Mousseau | G06F 16/27 |
| 2019/0014085 A1* | 1/2019 | Soliman | H04L 63/0263 |
| 2019/0014117 A1* | 1/2019 | Li | H04L 67/14 |
| 2019/0020905 A1* | 1/2019 | Bennett | H04N 5/917 |
| 2019/0025813 A1* | 1/2019 | Cella | G06F 18/2178 |
| 2019/0026445 A1* | 1/2019 | Ginsberg | H04L 9/0894 |
| 2019/0026456 A1* | 1/2019 | Hon | G06F 21/40 |
| 2019/0036697 A1* | 1/2019 | Jerichow | H04L 63/062 |
| 2019/0036906 A1* | 1/2019 | Biyani | H04L 63/08 |
| 2019/0036914 A1* | 1/2019 | Tzur-David | H04L 9/0861 |
| 2019/0044976 A1* | 2/2019 | Smith | H04L 67/12 |
| 2019/0052630 A1* | 2/2019 | Lapidous | H04L 63/0853 |
| 2019/0052659 A1* | 2/2019 | Weingarten | H04L 41/046 |
| 2019/0095478 A1* | 3/2019 | Tankersley | G06F 11/3006 |
| 2019/0097902 A1* | 3/2019 | Hardin | H04L 43/0817 |
| 2019/0104409 A1* | 4/2019 | Wu | H04L 63/20 |
| 2019/0109713 A1* | 4/2019 | Clark | G06F 16/182 |
| 2019/0109714 A1* | 4/2019 | Clark | H04L 67/565 |
| 2019/0109820 A1* | 4/2019 | Clark | H04L 9/0861 |
| 2019/0109821 A1* | 4/2019 | Clark | H04L 63/0414 |
| 2019/0109822 A1* | 4/2019 | Clark | H04L 63/145 |
| 2019/0109848 A1* | 4/2019 | Clark | H04L 9/3228 |
| 2019/0118767 A1* | 4/2019 | Britt | H04L 67/125 |
| 2019/0121348 A1* | 4/2019 | Cella | G06N 3/084 |
| 2019/0124671 A1* | 4/2019 | Starsinic | H04W 4/60 |
| 2019/0141526 A1* | 5/2019 | Bahrami | H04L 63/083 |
| 2019/0141610 A1* | 5/2019 | Sabella | G06F 9/45533 |
| 2019/0149545 A1* | 5/2019 | Arora | H04W 12/06 726/7 |
| 2019/0158353 A1* | 5/2019 | Johnson | G06F 16/95 |
| 2019/0173873 A1* | 6/2019 | Brown | H04L 63/0823 |
| 2019/0182734 A1* | 6/2019 | Laliberte | H04W 24/08 |
| 2019/0182895 A1* | 6/2019 | Di Girolamo | H04L 63/0892 |
| 2019/0190920 A1* | 6/2019 | Connell, II | H04W 12/71 |
| 2019/0230079 A1* | 7/2019 | Chung | H04L 63/0884 |
| 2019/0236868 A1* | 8/2019 | Rines | G07C 9/00896 |
| 2019/0245856 A1* | 8/2019 | Irwan | H04L 9/0643 |
| 2019/0246276 A1* | 8/2019 | Lingala | H04W 12/08 |
| 2019/0253461 A1* | 8/2019 | Bykampadi | H04L 63/205 |
| 2019/0255963 A1* | 8/2019 | Goei | B60L 53/68 |
| 2019/0260762 A1* | 8/2019 | Fynaardt | H04W 12/06 |
| 2019/0279212 A1* | 9/2019 | Brown | G06Q 20/409 |
| 2019/0281455 A1* | 9/2019 | Luo | H04W 12/08 |
| 2019/0286812 A1* | 9/2019 | Lounsberry | H04L 9/006 |
| 2019/0289466 A1* | 9/2019 | Conant | H04W 12/06 |
| 2019/0294765 A1* | 9/2019 | Fine | G16H 10/60 |
| 2019/0306251 A1* | 10/2019 | Talebi Fard | H04W 76/10 |
| 2019/0313468 A1* | 10/2019 | Talebi Fard | H04W 60/04 |
| 2019/0319686 A1* | 10/2019 | Chen, IV | H04W 24/08 |
| 2019/0319861 A1* | 10/2019 | Pan | H04L 9/0637 |
| 2019/0319916 A1* | 10/2019 | Venkataramanan | H04L 67/131 |
| 2019/0324439 A1* | 10/2019 | Cella | G06F 18/217 |
| 2019/0324444 A1* | 10/2019 | Cella | G05B 19/4183 |
| 2019/0334764 A1* | 10/2019 | Chor | H04L 41/0686 |
| 2019/0334869 A1* | 10/2019 | Grant | H04L 61/5007 |
| 2019/0339688 A1* | 11/2019 | Cella | H04L 1/18 |
| 2019/0342289 A1 | 11/2019 | Zhu | |
| 2019/0342874 A1* | 11/2019 | Davydov | H04W 72/23 |
| 2019/0351783 A1* | 11/2019 | Goei | B60L 53/63 |

(56) References Cited

U.S. PATENT DOCUMENTS

| | | | | |
|---|---|---|---|---|
| 2019/0356529 A1* | 11/2019 | Gulati | | H04L 9/3268 |
| 2019/0356661 A1* | 11/2019 | Hecht | | H04L 9/0891 |
| 2019/0364027 A1* | 11/2019 | Pande | | G06F 21/316 |
| 2019/0364049 A1* | 11/2019 | Boss | | G06F 21/45 |
| 2019/0372938 A1* | 12/2019 | Pasdar | | H04L 63/20 |
| 2019/0386969 A1* | 12/2019 | Verzun | | H04L 63/123 |
| 2019/0392162 A1* | 12/2019 | Stern | | G06F 21/6245 |
| 2019/0394061 A1* | 12/2019 | Chen | | H04L 12/283 |
| 2020/0004946 A1* | 1/2020 | Gilpin | | H04L 9/50 |
| 2020/0007385 A1* | 1/2020 | Obaidi | | H04L 43/10 |
| 2020/0021586 A1* | 1/2020 | Schmidt | | H04L 63/20 |
| 2020/0037226 A1* | 1/2020 | Magadevan | | H04W 4/70 |
| 2020/0043880 A1* | 2/2020 | Mohammed | | H01L 24/11 |
| 2020/0044868 A1* | 2/2020 | Vakulenko | | G06F 21/305 |
| 2020/0045016 A1* | 2/2020 | Chor | | H04L 63/0442 |
| 2020/0050749 A1* | 2/2020 | Barboi | | H04L 63/0227 |
| 2020/0052889 A1* | 2/2020 | Bendersky | | H04L 9/0861 |
| 2020/0053079 A1* | 2/2020 | Bendersky | | H04L 9/14 |
| 2020/0053096 A1* | 2/2020 | Bendersky | | G06F 21/32 |
| 2020/0067938 A1* | 2/2020 | Smith | | G06F 9/5072 |
| 2020/0068391 A1* | 2/2020 | Liu | | H04W 12/06 |
| 2020/0084212 A1* | 3/2020 | Saldanha | | H04L 63/101 |
| 2020/0092296 A1* | 3/2020 | Brinckman | | H04W 12/086 |
| 2020/0100108 A1* | 3/2020 | Everson | | H04L 9/0825 |
| 2020/0100187 A1* | 3/2020 | Balasubramanian | | H04W 52/241 |
| 2020/0100319 A1* | 3/2020 | Talebi Fard | | H04W 4/90 |
| 2020/0103894 A1* | 4/2020 | Cella | | G05B 23/0264 |
| 2020/0112555 A1* | 4/2020 | Brown | | H04L 63/083 |
| 2020/0120202 A1* | 4/2020 | Jakobsson | | H04L 63/105 |
| 2020/0127891 A9* | 4/2020 | Johnson | | H04L 67/141 |
| 2020/0133257 A1* | 4/2020 | Cella | | G05B 19/4183 |
| 2020/0134686 A1* | 4/2020 | Fahey | | G06Q 30/0601 |
| 2020/0137516 A1* | 4/2020 | Thoresen | | H04W 12/06 |
| 2020/0145409 A1* | 5/2020 | Pochuev | | H04W 4/70 |
| 2020/0169549 A1* | 5/2020 | Smith | | H04L 63/101 |
| 2020/0174517 A1* | 6/2020 | Martinez | | G06Q 10/06398 |
| 2020/0186355 A1* | 6/2020 | Davies | | H04L 63/123 |
| 2020/0186358 A1* | 6/2020 | Capola | | H04L 9/3228 |
| 2020/0196327 A1* | 6/2020 | Zhang | | H04W 72/21 |
| 2020/0205232 A1* | 6/2020 | Wang | | H04W 4/70 |
| 2020/0220985 A1* | 7/2020 | Keery | | H04N 1/00949 |
| 2020/0225655 A1* | 7/2020 | Cella | | G05B 19/41875 |
| 2020/0228311 A1* | 7/2020 | Capola | | H04L 9/065 |
| 2020/0252813 A1* | 8/2020 | Li | | H04W 24/08 |
| 2020/0274713 A1* | 8/2020 | Li | | H04L 9/3221 |
| 2020/0287888 A1* | 9/2020 | Moore | | H04L 63/0884 |
| 2020/0314731 A1* | 10/2020 | Ryu | | H04W 64/003 |
| 2020/0322332 A1* | 10/2020 | Haque | | H04L 9/3297 |
| 2020/0328885 A1* | 10/2020 | Tola | | G06F 21/575 |
| 2020/0344602 A1* | 10/2020 | Li | | H04L 67/125 |
| 2020/0348662 A1* | 11/2020 | Cella | | G05B 19/41865 |
| 2020/0349639 A1* | 11/2020 | Mousseau | | H04L 69/22 |
| 2020/0351656 A1* | 11/2020 | Johansson | | H04W 4/70 |
| 2020/0360821 A1* | 11/2020 | Weaver | | G07F 17/329 |
| 2020/0364323 A1* | 11/2020 | Bendersky | | G06K 19/06037 |
| 2020/0380506 A1* | 12/2020 | Chang | | H04L 63/0876 |
| 2020/0389495 A1* | 12/2020 | Crabtree | | G06F 16/2477 |
| 2020/0394332 A1* | 12/2020 | Jakobsson | | G06F 16/24573 |
| 2020/0412651 A1* | 12/2020 | Patidar | | H04L 63/0471 |
| 2020/0412767 A1* | 12/2020 | Crabtree | | H04L 63/1441 |
| 2021/0006400 A1* | 1/2021 | Hu | | G06F 21/64 |
| 2021/0006933 A1* | 1/2021 | Dean | | G16Y 40/10 |
| 2021/0012282 A1* | 1/2021 | Smith | | G06F 21/6245 |
| 2021/0012445 A1* | 1/2021 | Bartfai-Walcott | | H04L 63/10 |
| 2021/0014924 A1* | 1/2021 | Zheng | | H04W 76/20 |
| 2021/0019429 A1* | 1/2021 | Cooner | | G01J 1/4204 |
| 2021/0029100 A1* | 1/2021 | Bendersky | | H04L 63/0876 |
| 2021/0037012 A1* | 2/2021 | Kanemitsu | | G06F 21/31 |
| 2021/0041855 A1* | 2/2021 | Kursun | | G06N 20/00 |
| 2021/0044571 A1* | 2/2021 | Costa | | H04L 63/0807 |
| 2021/0044602 A1* | 2/2021 | Kursun | | H04L 63/105 |
| 2021/0044975 A1* | 2/2021 | Triest | | H04W 12/068 |
| 2021/0058323 A1* | 2/2021 | Thanneeru | | H04L 12/2856 |
| 2021/0058391 A1* | 2/2021 | Graybeal | | H04W 12/06 |
| 2021/0067350 A1* | 3/2021 | McClintock | | H04L 9/3263 |
| 2021/0067507 A1* | 3/2021 | Maruyama | | G06F 21/44 |
| 2021/0081271 A1* | 3/2021 | Doshi | | G06F 21/53 |
| 2021/0082548 A1* | 3/2021 | Bloxton | | G16H 20/30 |
| 2021/0092227 A1* | 3/2021 | Naujok | | H04M 3/42034 |
| 2021/0092646 A1* | 3/2021 | Polehn | | H04L 43/0858 |
| 2021/0099832 A1* | 4/2021 | Duan | | H04B 17/27 |
| 2021/0117251 A1* | 4/2021 | Cristofi | | G06F 9/542 |
| 2021/0136041 A1* | 5/2021 | Foxhoven | | H04L 63/0876 |
| 2021/0136084 A1* | 5/2021 | Dayan | | H04L 63/08 |
| 2021/0136563 A1* | 5/2021 | Chandrasekaran | | H04W 12/50 |
| 2021/0167963 A1* | 6/2021 | Autry | | H04L 9/3234 |
| 2021/0168115 A1* | 6/2021 | de la Oliva | | H04W 12/06 |
| 2021/0168132 A1* | 6/2021 | Smith | | H04L 67/12 |
| 2021/0173915 A1* | 6/2021 | Keith, Jr. | | H04L 63/0861 |
| 2021/0176218 A1* | 6/2021 | Keith, Jr. | | H04L 63/0884 |
| 2021/0208571 A1* | 7/2021 | Thomsen | | G06F 16/25 |
| 2021/0219268 A1* | 7/2021 | Li | | H04W 72/20 |
| 2021/0226959 A1* | 7/2021 | Griggio | | H04L 63/105 |
| 2021/0232680 A1* | 7/2021 | Hecht | | G06F 21/577 |
| 2021/0234875 A1* | 7/2021 | Hecht | | H04L 63/1416 |
| 2021/0250341 A1* | 8/2021 | Senftleber | | H04L 63/0884 |
| 2021/0258275 A1* | 8/2021 | Starsinic | | H04L 67/12 |
| 2021/0266302 A1* | 8/2021 | Daly | | G06F 21/44 |
| 2021/0266346 A1* | 8/2021 | Gordon | | H04L 63/0245 |
| 2021/0279341 A1* | 9/2021 | Huck | | H04L 9/0656 |
| 2021/0282003 A1* | 9/2021 | Li | | H04W 8/24 |
| 2021/0289351 A1* | 9/2021 | Ferdi | | H04W 12/041 |
| 2021/0306311 A1* | 9/2021 | Chifor | | H04L 63/162 |
| 2021/0314143 A1* | 10/2021 | Conner | | H04L 9/3239 |
| 2021/0314809 A1* | 10/2021 | Teyeb | | H04W 28/0278 |
| 2021/0344660 A1* | 11/2021 | Benkreira | | G06Q 40/02 |
| 2021/0374727 A1* | 12/2021 | Weaver | | G07F 17/3244 |
| 2021/0410084 A1* | 12/2021 | Li | | H04W 52/265 |
| 2022/0030431 A1* | 1/2022 | Peylo | | H04W 60/06 |
| 2022/0036323 A1* | 2/2022 | Sasaki | | G06Q 20/3678 |
| 2022/0070673 A1* | 3/2022 | Shaw | | H04W 12/37 |
| 2022/0078005 A1* | 3/2022 | Lanc | | G06F 21/6245 |
| 2022/0078209 A1* | 3/2022 | V | | H04L 63/105 |
| 2022/0103525 A1* | 3/2022 | Shribman | | G06F 16/9574 |
| 2022/0103588 A1* | 3/2022 | Shaw | | H04L 61/4511 |
| 2022/0103596 A1* | 3/2022 | Shaw | | G06Q 20/123 |
| 2022/0137948 A1* | 5/2022 | Chang | | G06F 8/65 717/173 |
| 2022/0159605 A1* | 5/2022 | Li | | H04W 60/00 |
| 2022/0191962 A1* | 6/2022 | Di Girolamo | | H04L 5/0053 |
| 2022/0237964 A1* | 7/2022 | Yim | | H04B 11/00 |
| 2022/0255916 A1* | 8/2022 | Smith | | H04L 9/3247 |
| 2022/0303282 A1* | 9/2022 | Barriga | | H04L 63/0281 |
| 2023/0284077 A1* | 9/2023 | Pateromichelakis | | H04L 47/28 370/235 |

FOREIGN PATENT DOCUMENTS

| | | | | |
|---|---|---|---|---|
| WO | 2017/218775 A1 | 12/2017 | | |
| WO | WO-2019009928 A1 * | 1/2019 | | G16Y 30/10 |
| WO | 2020/133467 A1 | 7/2020 | | |

OTHER PUBLICATIONS

Solano et al "One-Time URL: A Proximity Security Mechanism between Internet of Things and Mobile Devices," Sensors, MDPI, pp. 1-17 (Year: 2016).*

Sudar et al "Time-based One-Time Password for Wi-Fi Authentication and Security," IEEE, pp. 1212-1215 (Year: 2017).*

Shahzad et al "Continuous Authentication and Authorization for the Internet of Things," IEEE Internet Computing, pp. 86-90 (Year: 2017).*

Irie et al "Automatic Roaming Consortium Discovery and Routing for Large-Scale Wireless LAN Roaming Systems," 2018 IEEE 23rd International Workshop on Computer Aided Modeling and Design of Communication Links and Networks (CAMAD), pp. 1-6 (Year: 2018).*

Tarouco et al "Internet of Things in Healthcare: Interoperability and Security Issues," International Workshop in Mobile Consumer Health Care Networks, Systems and Services, pp. 6121-6125 (Year: 2012).*

(56) References Cited

OTHER PUBLICATIONS

Rattanalerdnusorn et al "Security Implementation for Authentication in IoT Environments," 2019 IEEE 4th International Conference on Computer and Communication Systems, IEEE, pp. 678-681 (Year: 2019).*
Garg et al "Securing IoT Devices and Securely Connecting the Dots Using REST API and Middleware," IEEE, pp. 1-6 (Year: 2019).*
Guntuku et al "Secure Authentication Scheme for Internet of Things in Cloud," IEEE, pp. 1-7 (Year: 2018).*
Patent Cooperation Treaty: International Search Report and Written Opinion for PCT/US2021/044667 dated Nov. 15, 2021; 10 pages.
European Patent Office: Extended European Search Report issued is EP Application No. 21889773.4, dated Mar. 4, 2024; 12 pages.

* cited by examiner

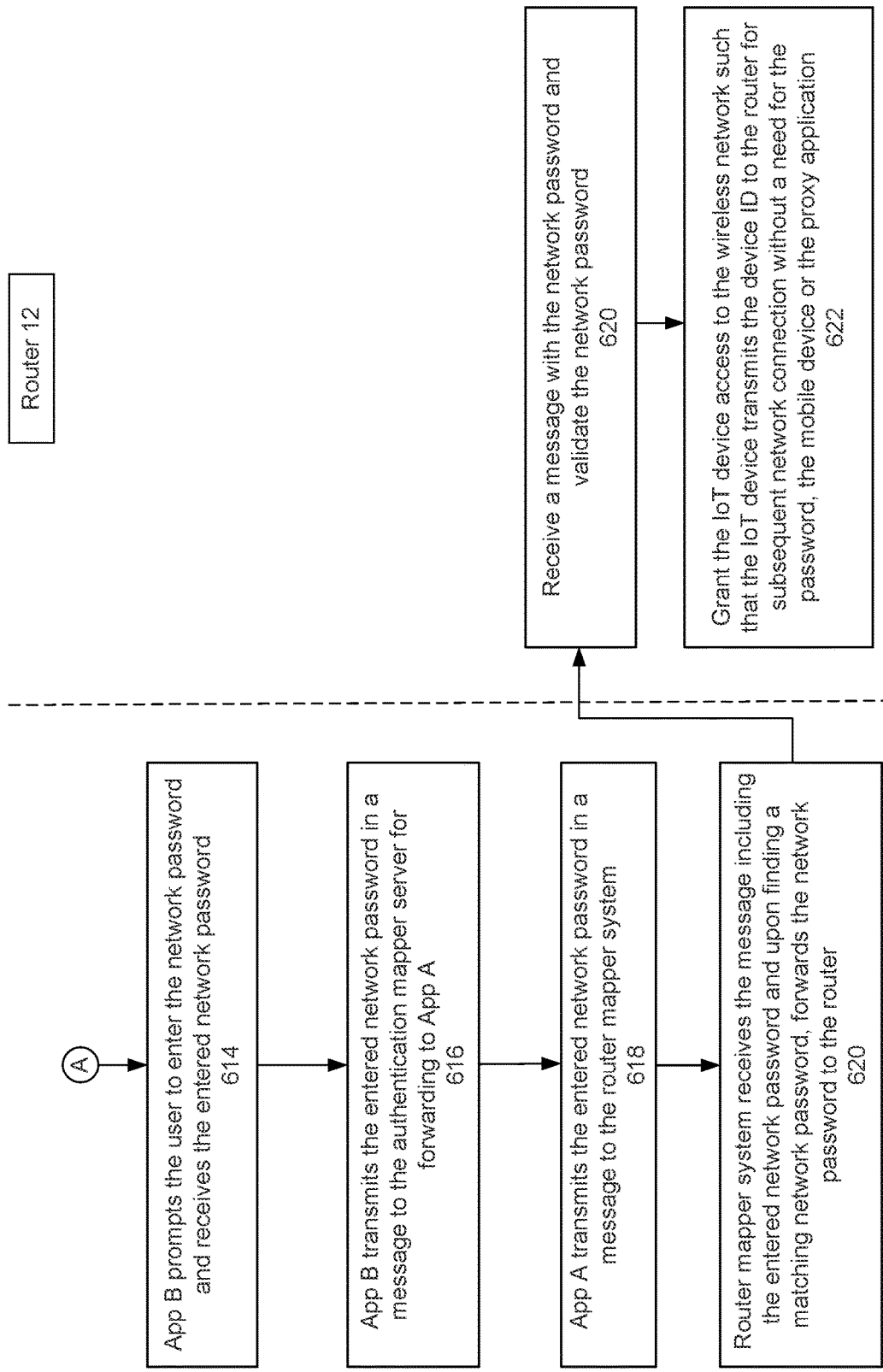

ONE-TIME WIRELESS AUTHENTICATION OF AN INTERNET-OF-THINGS DEVICE

BACKGROUND

Today, the use of Internet-of Things (IoT) devices are proliferating. An IoT device is an electronic computing device that connects wirelessly to a network and has the ability to transmit data over the network. IoT devices are nonstandard computing devices in that they are typically not equipped with a user interface for user interaction and focus instead on machine-to-machine communication. The lack of a user interface can be problematic when the IoT device needs to connect to the wireless network the first time with necessary access credentials (e.g., user name and password), which are typically entered by a user. If the IoT has the requisite size, then the IoT device can be equipped with some type of user interface, such as a small keyboard and/or screen. However, adding a user interface comes at a cost.

Accordingly, it be desirable to provide an improved method and system for wireless authentication of an IoT device.

BRIEF SUMMARY

The exemplary embodiments provide methods and systems for one-time wireless authentication of an Internet-of-Things device. Aspects of exemplary embodiment include receiving, by a proxy application executing on a mobile device during a registration process, a device ID associated with the IoT device. The proxy application transmits the device ID to a router of the wireless network. Subsequent to the registration process, the proxy application receives the device ID from the router in response to the router receiving an authorization request with no network password from the IoT device for access to the wireless network, where the router forwards the device ID to the proxy application. The proxy application prompts the user of the mobile device to enter the password, and transmits the entered network password to the router, such that the router validates the password and grants the IoT device access to the wireless network, the IoT device transmits the IoT device ID to the router for subsequent network connection without a need for the mobile device.

In another embodiment, methods and systems for one-time wireless authentication of an Internet-of-Things device comprises a router receiving a registration request from a proxy application executing on a mobile device, the registration request including a device identifier associated with the IoT device, the device identifier entered into the proxy application by a user of the mobile device, the router further storing the device identifier and enabling a proxy authentication setting. The router receives an authorization request from the IoT device for access to a wireless network, the authorization request comprising at least the device identifier without a network password. The router determines if a proxy authentication setting is enabled, and if so forwards the device identifier to the proxy application. The router receives a message from the proxy application, a message including a network password entered into the proxy application by the user. Responsive to the router validating the network password, the router grants the IoT device access to the wireless network, wherein the IoT device transmits the device identifier to the router for subsequent connection without a need for the mobile device or the proxy application.

According to the method and system disclosed herein, the disclosed embodiments enable easy wireless Internet connectivity for an Internet-of-Things device having no provisions for password entry, thus eliminating the need for keys and user interaction through the Internet-of-Things device. The methods and systems facilitate such Internet-of-Things devices to connect to the Internet of long as the Internet-of-Things devices are pre-configured for proxy authentication using the mobile application in conjunction with software changes in the router.

DETAILED DESCRIPTION

Figure 1:
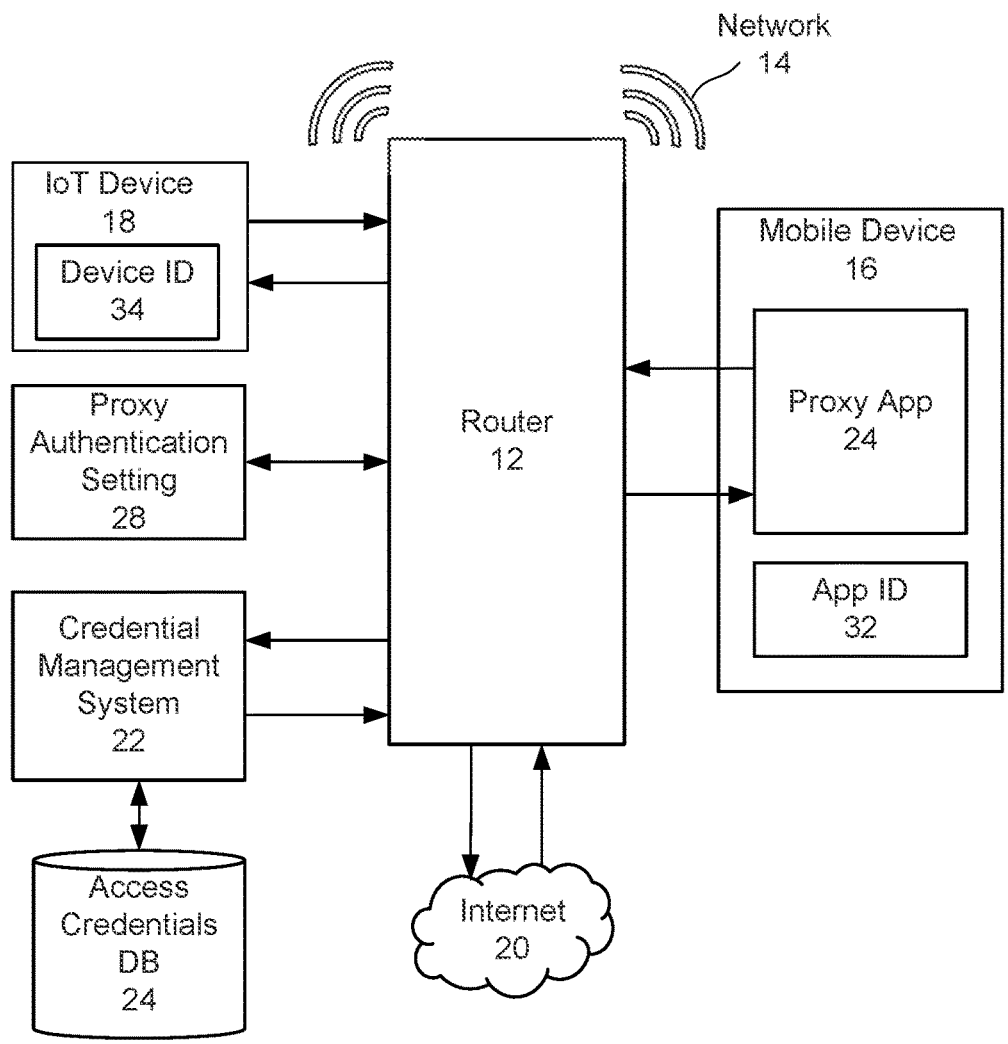
FIG. 1 is a block diagram illustrating a system for enabling a mobile application to provide one-time wireless authentication of an Internet-of-Things device according to a first embodiment.

The exemplary embodiment relates to a mobile application for one-time wireless authentication of an Internet-of-Things device. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.\ As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a request or message may refer to a network packet (e.g., a data packet and/or the like) that includes data.

To provide context for the disclosed embodiments, today a wireless router provides and communications over a local or home wireless (Wi-Fi) network and connects to the Internet via a modem. An electronic device needing access to the wireless network needs to send access credentials, such as a network password, to the router. The first time an electronic device connects to the wireless network, a user typically inputs the network password, which is transmitted to the router. The router then sends an authentication request with the access credentials to a credential management system. The credential management system can be local to the router or a remote server. The credential management system receives the authentication request and authenticates the access credentials against previously stored access credentials for the router. The credential management system sends a response to the router either allowing or denying network access, and the router then either grants the device network access or alternatively sends a denial message.

For electronic devices with no provisions for manual entry of access credentials, such as an Internet-of-Things (IoT) device, methods and systems are required to facilitate easy wireless network and Internet connectivity through the router.

According to the disclosed embodiments, a one-time authentication process is provided for an IoT device to use a wireless network without the need for the IoT device to have a user interface for entering access credentials. Instead, a mobile phone of the user, and in particular, an application on the mobile phone, acts as a proxy to provide one-time wireless authentication of the IoT device with a router of a wireless network during first access. Thereafter, if the IoT device becomes disconnected from the network, the IoT device can reconnect to the network by transmitting the device ID of the IoT device to the router for subsequent connection without requiring aid of the mobile device. Several embodiments are herein described that collectively unify the idea of proxy authentication by encapsulating underlying security controls and data distribution.

FIG. 1 is a block diagram illustrating a system for enabling a mobile application to provide one-time wireless authentication of an Internet-of-Things device according to a first embodiment. The system 10 includes a router 12 that provides a network 14 and communicates over the network 14 and the Internet 20. The router 12 is connected to the Internet 20 through a gateway (not shown). In one embodiment, the network is a wireless network, but wired connections (e.g., Ethernet) with the router 12 can also be made. As used herein, a "router" is a networking device forwards data packets between computer networks for example, in the home and small office environment, Internet protocol (IP) routers simply forward IP packets between home/office computing devices and the Internet.

A mobile device 16 is wirelessly connected to the network 14, and an Internet-of-Things (IoT) device 18 requires first time access to the network 14. A "mobile device" may be a device that is operated by a user. Examples of mobile devices 16 may include a mobile phone, a smart phone, a laptop computer, a desktop computer, a server computer, a vehicle such as an automobile, a thin-client device, a tablet PC, etc. Additionally, mobile devices may be any type of wearable technology device, such as a watch, earpiece, glasses, etc. The mobile device 16 may include one or more processors capable of processing user input. The mobile device 16 may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The mobile device may comprise any electronic device that may be operated by a user, which may also provide remote communication capabilities to a network. Examples of remote communication capabilities include using a mobile phone (wireless) network, wireless data network (e.g., 3G, 4G, 5G or similar networks), Wi-Fi, Wi-Max, or any other communication medium that may provide access to a network such as the Internet or a private network.

As used herein, an Internet of things (IoT) device describes an electronic device—"a thing"—that is embedded with sensors, software, and other technologies for the purpose of connecting and exchanging data with other devices and systems over the Internet or other network.

The router 12 may communicate with a credential management system 22, which maintains an access credentials database 25. When the router 12 receives an authentication request from a device, e.g., the IoT device 18, for network access, the router 12 may forward the authentication request to the credential management system 22 to authenticate the requesting device.

The IoT device 18 is associated with a device identifier (ID) 34, and the proxy application 24 is associated with an application (app) ID 32. The IDs 34 and 32 may include any distinctive set of alphanumeric characters (numbers, graphics, symbols letters or other information) that can be used to identify a device or a program. For example, the device ID 34 may comprise a serial number, partial serial number, a key and the like, or a combination thereof, associated with the IoT device 18.

In one embodiment, the router 12, the IoT device 18, and the mobile device 18 are configured to receive and transmit messages over the network 14 using the Internet protocol suite otherwise known as Transmission Control Protocol (TCP) and the Internet Protocol (IP) or TCP/IP.

According to the disclosed embodiments, since a user cannot enter the access credentials for the network 14 on the IoT device 18 due to its lack of a user interface, the system 10 further includes a mobile application, referred to herein as a proxy application (proxy app) 24 that acts a proxy for the IoT device 18 during the first network authentication attempt with the router 12, and a proxy authentication setting 28 for the router 12. In embodiments, the authentication mapping server 326 maintains a mapping between the IoT device 18 and the proxy application 24.

According to embodiments, the system 10 associates the proxy app 24 with the app ID 32. The app ID 32 may be a special purpose software key, a mobile phone number associated with the mobile device 16, a partial phone number, a software key, and the like, or a combination thereof. When associated with the proxy application 24, the app ID 32 may be used by the system 10 to determine the mobile device 16 on which the proxy application 24 is installed.

Figure 2:
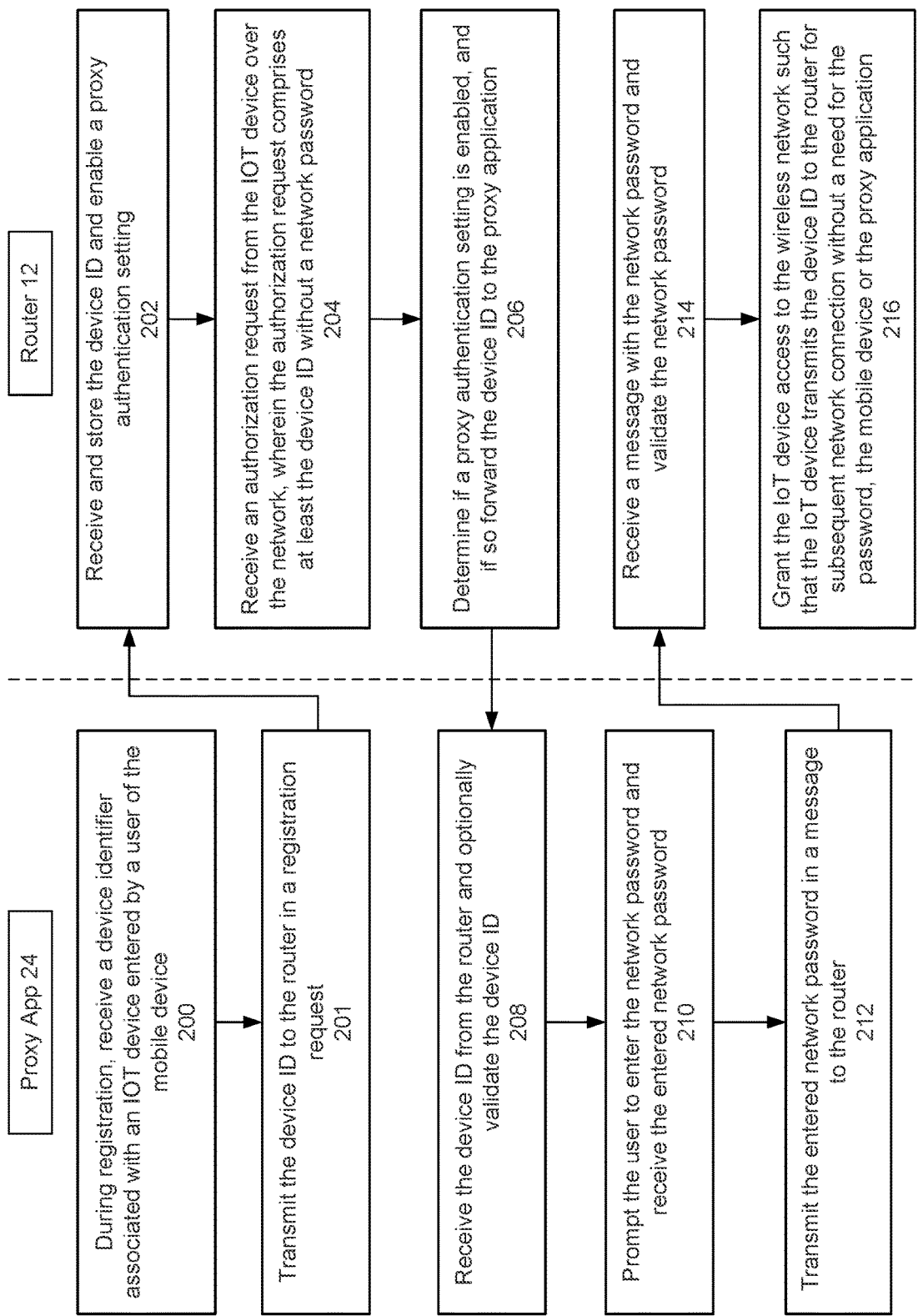
FIG. 2 is a flow diagram illustrating an overview of a process for one-time wireless authentication of an Internet-of-Things device in accordance with some embodiments.

FIG. 2 is a flow diagram illustrating an overview of a process for one-time wireless authentication of an Internet-of-Things device in accordance with some embodiments. As an overview, the process occurs between the router 12 and the proxy application 24 executing on the mobile device 16 of the user. The process assumes that access credentials, such as a password, for the wireless network 14 have been sent from the router 12 to the credential management system 22 and stored in access credentials database 25. The process further assumes the user has installed the proxy application 24 on the user's mobile device 16 in order to configure the IoT device 18 for a one-time proxy authentication to the wireless network 14.

The one-time wireless authentication process includes a registration phase in which the proxy application 24 is opened and receives the device ID 34 associated with the IoT device 18 that is entered by a user (block 200). This step may be initiated in response to a user who wants to set up the IoT device 18 and presses a "registration button" displayed by proxy application 24 to register the IoT device 18. Thereafter, the proxy application 24 displays a field into which the user may enter the device ID 34. The device ID 34 may comprise a serial number or other identifier of the IoT device 18. The user may find the device ID 34 on the IoT device 18 itself or in documentation provided with the IoT device 18.

The proxy application 24 transmits the device ID to the router 12 in a registration request (block 201). The router 12 receives the registration request, stores the device ID 34 in the credential management system 22, and enables the proxy authentication setting 28 (block 202). In one embodiment, the credential management system 22 may comprise part of a local backend system for the router 12. In another embodiment, the credential management system 22 may be a remote site on the Internet 20. The proxy authentication setting can be stored by the router 12 or by the credential management system 22.

In one embodiment, the registration phase may include the proxy application 24 associating the device ID 34 with the app ID 32 of the proxy application 24. In one embodiment, a mapping of the device ID 34 to the app ID 32 may be registered as an ID pair with the router 12 or another system (e.g., an authentication mapper server 326 shown in FIG. 3). In one embodiment, the proxy application 24 sends both the device ID 34 and the app ID 32 as an ID pair in the registration request sent to the router 12 in block 201. The router 12 may then store the mapping of the ID pair in the credential management system 22 or forward the ID pair to another system in block 202.

Subsequent to the registration process, the router 12 receives, an authorization request from the IoT device 18 over the network 14, wherein the authorization request comprises at least the device ID 34 without a network password (block 204). In one embodiment, when the IoT device 18 is first turned on, the IoT device 18 may be configured to determine automatically which one of a plurality of detected wireless networks to request access. This may be done by selecting the network 14 having the highest signal strength based on the assumption that the physically closest router 12 would have the best signal, as is typically the case in a local network environment. If the IoT device 18 fails to receive a reply to the authorization request within a predetermined time threshold, the IoT device 18 may send an authentication request to a router of another network having the next highest signal strength and so on until the IoT device finds the router with proxy authentication enabled.

The router 12 then determines if the proxy authentication setting 28 is enabled, and if so, forwards the device ID 34 to the proxy application 24 (block 206). If the proxy authentication setting 28 is not enabled, the process ends with the router sending a denial message to the IoT device 18. The proxy application 24 receives the device ID 34 from the router 12, and optionally validates the device ID (block 208). In response to the proxy application 24 validating the device ID 34 (e.g., by checking an internal setting, table or database), the proxy application 24 prompts the user to enter the network password and receives the entered network password (block 210). The proxy application 24 then transmits the entered network password in a message to the router 12 (block 212).

The router 12 receives a message including the entered network password and validates the entered network password (block 214). In one embodiment, the router 12 validates the entered network password by sending a validation request to the credential management system 22, which validates the network password if a match is found for the password in the access credentials database 25. In one embodiment, the credential management system 22 may be part of a backend system for the router.

Responsive to validating the entered network password, the router 12 sends a success message to the IoT device 18 granting access to the wireless network, wherein the IoT device 18 transmits the device ID 34 to the router 12 for subsequent connection without a need for the network password, the mobile device 16, or the proxy application 24 (block 216). That is, the IoT device 18 typically stays connected to the wireless network 14, but if the IoT device 18 becomes disconnected, the IoT device 18 resends the device ID 34 to the router 12. The router 12 looks up the device ID 34 and if found reestablishes the network connection, all without any input from the user or the mobile device 16.

Figure 3:
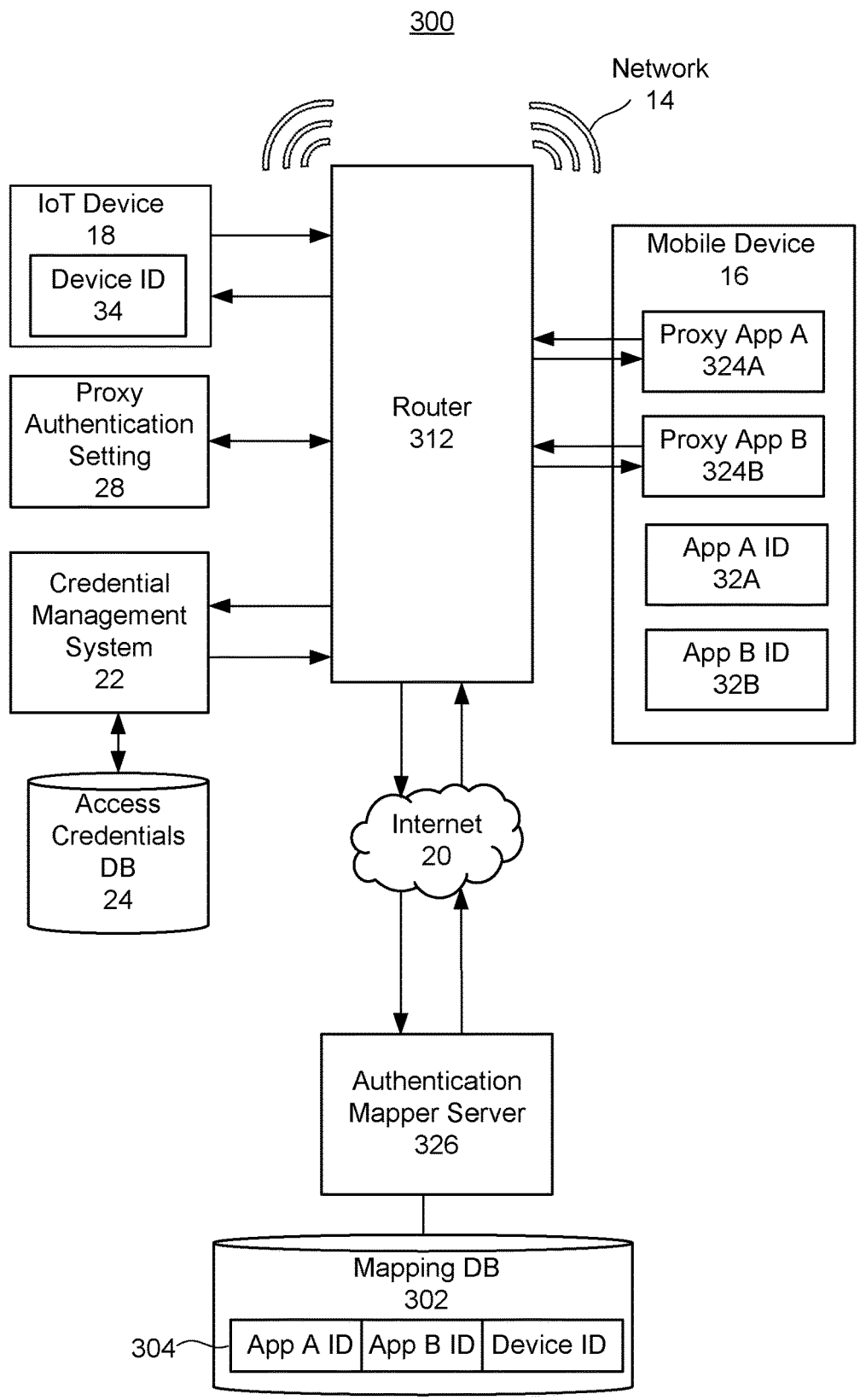
FIG. 3 is a block diagram illustrating a system for enabling a mobile application to provide one-time wireless authentication of an Internet-of-Things device according to a second embodiment.

FIG. 3 is a block diagram illustrating a system for enabling a mobile application to provide one-time wireless authentication of an Internet-of-Things device according to a second embodiment, where like components from FIG. 1 have like reference numerals.

The system 300 is similar to the system 10 of FIG. 1, except provides additional security by separating functionality of the proxy application into two separate applications (apps), referred to herein as proxy app A 324A and proxy app B 324B, installed on mobile device 16. In this embodiment, proxy app A 324A is associated with an app A ID 32A and proxy app B 324B is associated with an app B ID 32B. Both the app A ID 32A and the app B ID 32B may include the unique mobile phone number of the mobile device 16 in which the apps are installed.

According to one embodiment, for additional security the proxy system 300 further includes an authentication mapper server 326 in communication with the router 312 over the Internet 20, which is configured to communicate request and responses for proxy app A 324A and proxy app B 324B so that proxy app A 324A and proxy app B 324B do not communicate with one another directly. The term "server" may refer to one or more computing devices, such as processors, storage devices, and/or similar computer components, that communicate with client devices and/or other computing devices over a network, such as the Internet or private networks and, in some examples, facilitate communication among other servers and/or client devices. For example, the server computer can be a large mainframe, a minicomputer cluster, or a group of servers functioning as a unit. In one example, the server computer may be a database server coupled to a Web server, and may include or be coupled to a database.

In one embodiment, the authentication mapper server 326 communicate with proxy app A 324A and proxy app B 324B though, for example, a Representational state transfer (REST) application programming interface (API) or REST API.

This second embodiment provides additional security by establishing distributed controls and distributed ownership on the data. For example, the authentication mapper server 326 may have control over network authentication and may be provided and/or run by a manufacturer of the router 312. Any subsequent need of decoupling or disabling a IoT device 18 from proxy authentication may require the manufacturer of the IoT device 18 to update the authentication mapper server 326 through the router manufacture.

In one embodiment, proxy app A 324A is configured to receive from the router 312 the device ID 34 of the IoT device 18 during the request for network authorization, and determine if that specific IoT device has been enabled for proxy authentication by forwarding the device ID 34 to the authentication mapper server 326 to validate the device ID. Proxy app B 324B is configured to respond to a validation message from the authentication mapper server 326 by displaying a popup screen prompting the user to enter the network password and to send the entered network password to the router 512 for validation through the authentication mapper server 326 and proxy app A 324A, as explained below.

Technically proxy app A 324A and proxy app B 324B have different functionalities, but in an alternative embodiment can combined into one proxy application on the mobile device 16, as in FIG. 1. Also multiple IoT devices can use the dual proxy applications or the single proxy application in the mobile device 16 for this initial setup.

Figure 4:
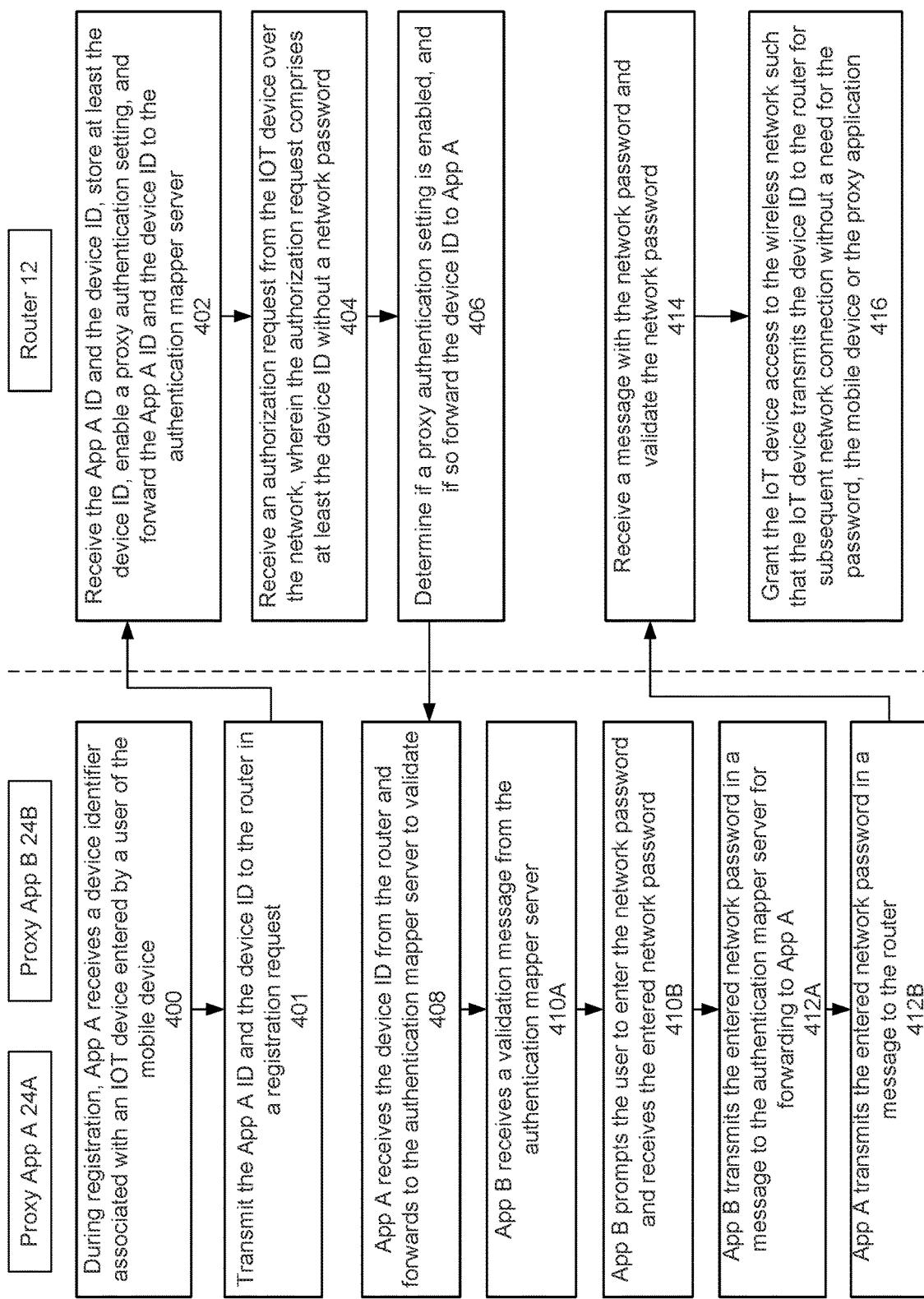
FIG. 4 is a flow diagram illustrating the process for one-time wireless authentication of an Internet-of-Things device in accordance with the second embodiment of FIG. 3.

FIG. 4 is a flow diagram illustrating the process for one-time wireless authentication of an Internet-of-Things device in accordance with the second embodiment of FIG. 3. The one-time wireless authentication process includes a registration phase that assumes once proxy app A 324A and proxy app B 324B are started the first time on the mobile device 16, proxy app A 324A and proxy app B 324B register the respective app A ID 32A and the app B ID 32B as an application pair with the authentication mapper server 326. The authentication mapping server 326 may store the registration of the app A ID 32A and the app B ID 32B as an application ID pair in the mapping database 302.

Referring both to FIGS. 3 and 4, during the registration phase proxy app A 324A displays a user interface in which to receive the device ID 34 associated with the IoT device 18 entered by a user (block 400). This step may be initiated in response to a user desiring to set up the IoT device 18 and pressing a "registration button" on proxy app A 324A or proxy app B 324B to register the IoT device 18. Thereafter, the proxy app A 324A displays a field into which the user may enter the device ID 34. Proxy app A 324A receives the device ID 34 and transmits both the app A ID 32A and device ID 34 as an ID pair in a registration request to the router 312 (block 401).

The router 312 receives the registration request, i) enables the proxy authentication setting 28, ii) stores at least the device ID 34, and iii) forwards the ID pair to the authentication mapper server 326 in a registration request (block 402). Once the authentication mapper server 326 receives the ID pair, the authentication mapper server 326 uses the app A ID 32A to find the record 304 having a matching app A ID 32A in the mapping database 302, and stores/associates the device ID 34 with the application ID pair in record 304. In an alternative embodiment, proxy app B 324B may be used instead of proxy app A 324A in the above registration process.

Subsequent to the registration process, the router 312 receives, an authorization request from the IoT device 18 over the network 14, wherein the authorization request comprises at least the device ID 34 without a network password (block 404). As an example, the authorization request may include DeviceID: "tdrgsthawu2n4n5j9aj415n2v97 cm3bc78h3vn678" for instance.

The router 312 then determines if the proxy authentication setting 28 is enabled, and if so, forwards the device ID 34 to the proxy app A 324A (block 406). In one embodiment, the router 312 receives and forwards the authorization request over the network 14 using the Internet protocol suite otherwise known as Transmission Control Protocol (TCP) and the Internet Protocol (IP).

Proxy app A 324A receives the device ID 34 from the router 312, and forwards the device ID 34 in a validation request to the authentication mapper server 326 for validation (block 408). In response, proxy app B 324B receives a validation response from the authentication mapper server 326 in response to the validation request of proxy app A 324A (block 410A). In embodiments, the authentication mapper server 326 upon receiving the validation request, first uses the device ID 34 to search the mapping database 302 to find the mapping record 304 having a matching device ID 34, and once found, the authentication mapper server 326 sends the validation response to the proxy app B 324B listed in the matching mapping record 304 via the preconfigured REST API.

For example the authentication mapper server 326 may store the preconfigured REST API as:
(https://www.appa.appid/{info}) APP A—
deviceKey:"tdrgsthawu2n4n5j9aj415n2v97
cm3bc78h3vn678-----→APP B
(https://www.appb.appId/{Info}),
where the preconfigured REST API informs the authentication mapper server 326 to call https://www.appb.appId/{Info} registered by app B, for any incoming requests from App A corresponding to deviceKey: "tdrgsthawu2n4n5j9aj415n2v97 cm3bc78h3vn678."

In response to receiving the response from the authentication mapper server 326 validating the device ID 34, proxy app B 324B prompts the user to enter the network password and receives the entered network password (block 410B). Proxy app B 324B then transmits the entered network password in a message to the authentication mapper server 326 for forwarding to proxy app A 324A via the preconfigured REST API (block 412A). Proxy app A 324A then transmits the entered network password in a message to the router 12 (block 412B).

The router 312 receives a message including the entered network password and validates the entered network password (block 414). In one embodiment, the router 312 validates the entered network password by sending a validation request to the credential management system 22, which does so if a match is found for the password in the access credentials database 24. In one embodiment, the credential management system 22 may be part of a backend system for the router 312.

Responsive to validating the entered network password, the router 312 sends a success message to the IoT device 18 granting access to the wireless network, wherein the IoT device 18 transmits the device ID 34 to the router 312 for subsequent connection without a need for the network password, the mobile device 16 or the proxy applications 324A and 324B (block 416).

Figure 5:
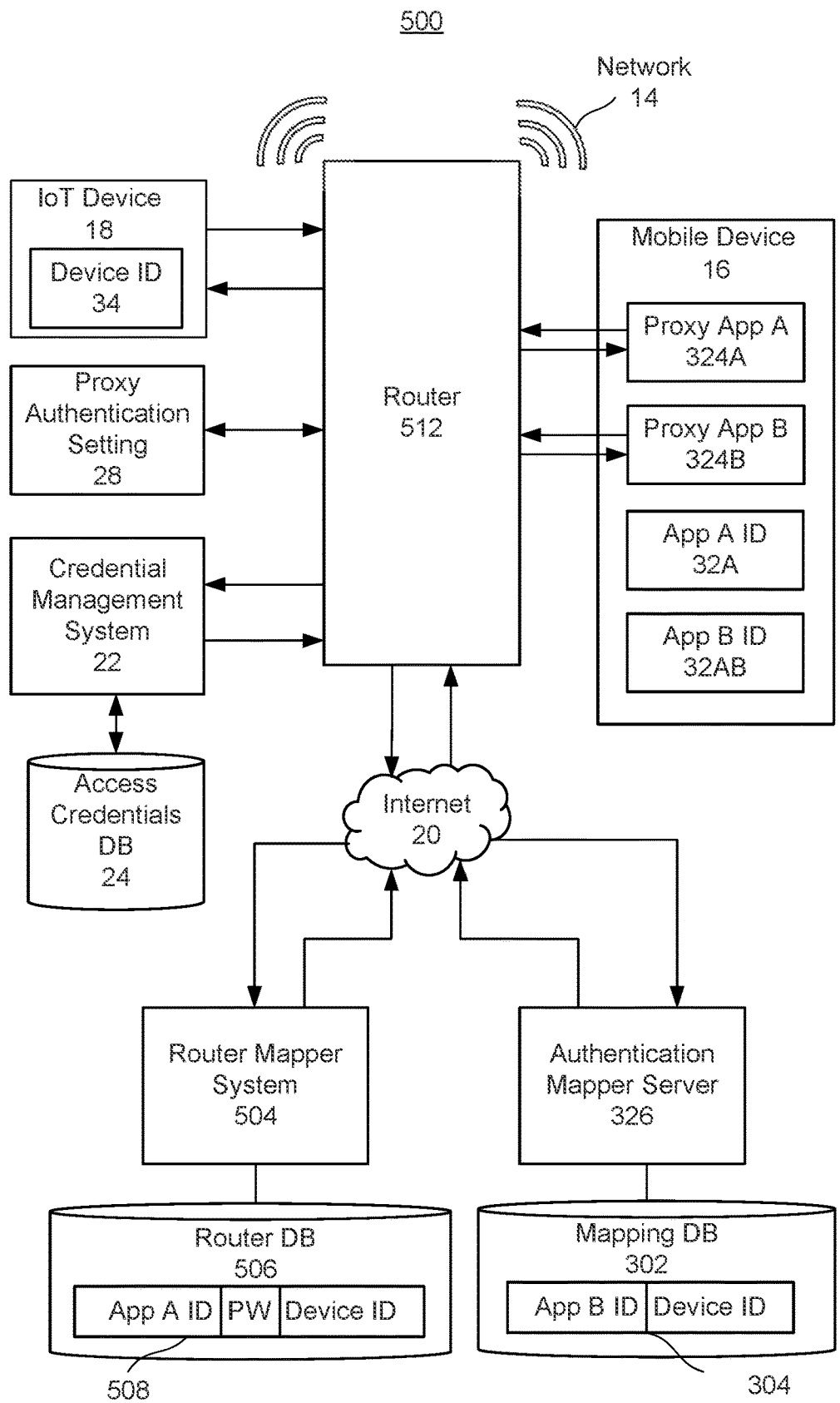
FIG. 5 is a block diagram illustrating a system for enabling a mobile application to provide one-time wireless authentication of an Internet-of-Things device according to a third embodiment.

FIG. 5 is a block diagram illustrating a system for enabling a mobile application to provide one-time wireless authentication of an Internet-of-Things device according to a third embodiment, where like components from FIG. 3 have like reference numerals. The system 500 is similar to the system 300 of FIG. 3, except in addition to using the two separate proxy applications, proxy app A 324A and proxy app B 324B, system 500 further includes a router mapper system 502. In this embodiment, proxy app A 324A is associated with an app A ID 32A and proxy app B 324B is associated with an app B ID 32B, where both the app A ID 32A and the app B ID 32B may include the unique mobile phone number of the mobile device 16 in which the apps are installed.

The third embodiment enables the manufacturer of the router 512 and the manufacturer of the IoT device 18 to share responsibility for the proxy authentication. For example, the manufacturer of the router 512 may control the router mapper system 504, while the manufacturer of the IoT device 18 may control the authentication mapper server 326. During the proxy authentication process, input from both the router mapper system 504 and the authentication mapper server 326 is required, as described with respect to FIG. 6.

Figure 6:
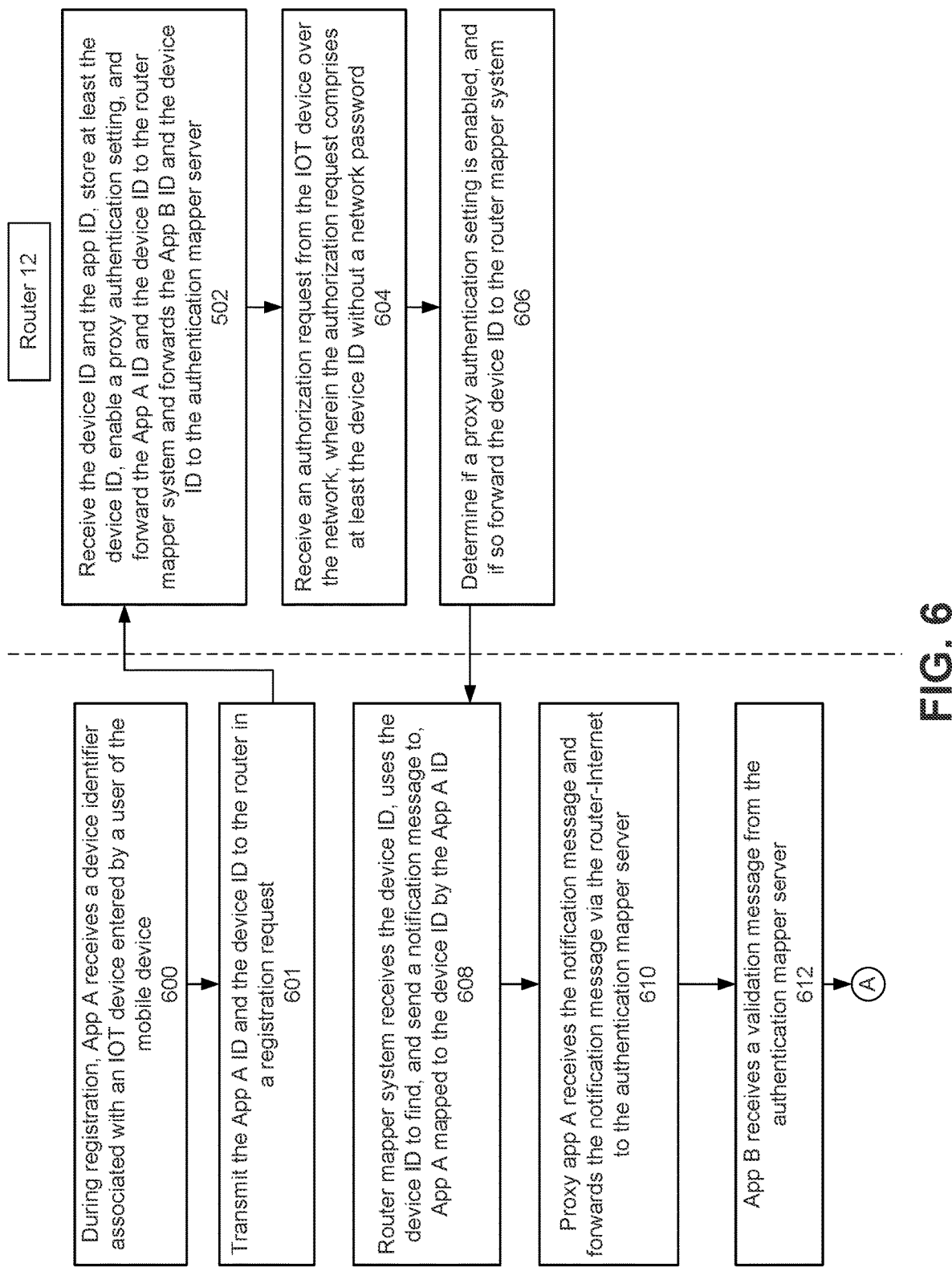
FIG. 6 is a flow diagram illustrating the process for one-time wireless authentication of an Internet-of-Things device in accordance with the third embodiment of FIG. 5.

FIG. 6 is a flow diagram illustrating the process for one-time wireless authentication of an Internet-of-Things device in accordance with the third embodiment of FIG. 5. The one-time wireless authentication process includes a registration phase that assumes once proxy app A 324A and proxy app B 324B are started the first time on the mobile device 16 that: i) a mapping between the app A ID 32A and the network password (PW) is registered with the router mapper system 504; and ii) the app B ID 32B is registered with the authentication mapper server 326. This pre-mapping process safeguards the router 512 from having to receive authentication request from proxy apps on connected mobile devices other than from authorized proxy app A 324A and proxy app B 324B on mobile device 16 by checking any such request against the router DB 506 and the mapping DB 302.

Referring both to FIGS. 5 and 6, during the registration phase proxy app A 324A displays a user interface in which to receive the device ID 34 associated with the IoT device 18 entered by a user (block 600). Proxy app A 324A receives the device ID 34 and transmits both the app A ID 32A and device ID 34 as an ID pair in a registration request to the router 312 (block 601).

The router 312 upon receiving the registration request: i) enables the proxy authentication setting 28, ii) stores at least the device ID 34, and iii) forwards the device ID pair to the router mapper system 504 in one registration request, and iv) forwards the app B ID 32B and the device ID 34 to the authentication mapper server 326 in another registration request (block 602).

As shown in FIG. 5, the router mapper system 504 may store the device ID 34 in a record 508 of router database 506 associating app A ID 32A and the network password. Similarly, the authentication mapper server 326 may store the device ID 34 in a record 304 of mapping database 302 containing the app B ID 32B.

Subsequent to the registration process, the router 312 receives, an authorization request from the IoT device 18 over the network 14, wherein the authorization request comprises at least the device ID 34 without a network password (block 604). As an example, the authorization request may include DeviceID: "tdrgsthawu2n4n5j9aj415n2v97 cm3bc78h3vn678" for instance.

The router 312 then determines if the proxy authentication setting 28 is enabled, and if so, forwards the device ID 34 to the router mapper system 504 (block 606).

The router mapper system 504 receives the device ID 34 and uses the device ID 34 to find, and send a notification message to, the proxy app A 324A mapped to the device ID 34 by the app A ID 32A (block 608). In one embodiment, the notification message is sent using the preconfigured REST API. For example the router mapper system 504 may store the preconfigured REST API as:

(https://www.appa.appid/{info}) APP A—
deviceKey:"tdrgsthawu2n4n5j9aj415n2v97
    cm3bc78h3vn678----→Mobile device
APP A (https://www.appa.appId/{Info}), where the preconfigured REST API in the router mapper system 504 informs the authentication mapper server 326 to call https://www.appa.appId/{Info} registered by app A, for any incoming requests from the router 512 corresponding to deviceKey: "tdrgsthawu2n4n5j9aj415n2v97 cm3bc78h3vn678.

In response, proxy app A 324A receives the notification message from the router mapper system 504 and forwards the notification message through the router-Internet to the authentication mapper server 326 (block 610). In response, proxy app B 324B receives a validation response from the authentication mapper server 326 in response to notification message from proxy app A 324A (block 612). That is, the authentication mapper server 326 first uses the device ID 34 received from proxy app A 324A to search the mapping database 302 to find the mapping record 304 having a matching device ID, and once the matching mapping record 304 is found, the authentication mapper server 326 sends the validation response to the proxy app B 324B mapped to the device ID in mapping record 304 via the preconfigured REST API.

For example the authentication mapper server 326 may store the preconfigured REST API as:

(https://www.appa.appid/{info}) APP A—
deviceKey:"tdrgsthawu2n4n5j9aj415n2v97
    cm3bc78h3vn678----→APP B
(https://www.appb.appId/{Info}), where the preconfigured REST API informs the authentication mapper server 326 to call https://www.appb.appId/

{Info} registered by app B, for any incoming requests from App A corresponding to deviceKey: "tdrgsthawu2n4n5j9aj415n2v97 cm3bc78h3vn678.

In response to receiving the response from the authentication mapper server 326 validating the device ID 34, the proxy app B 324B prompts the user to enter the network password and receives the entered network password (block 614). Proxy app B 324B then transmits the entered network password in a message to the authentication mapper server 326 for forwarding to proxy app A 324A via the preconfigured REST API (block 616). Proxy app A 324A then transmits the entered network password in a message to the router mapper system 504 using the REST API (block 618).

The router mapper system 504 receives a message including the entered network password and upon finding a matching network password, transmits the network password to the router 512 (block 620). The router 512 receives a message including the entered network password and validates the network password (block 622). In one embodiment, the router 512 validates the entered network password by sending a validation request to the credential management system 22, which does so if a match is found for the password in the access credentials database 24.

Responsive to validating the entered network password, the router 512 sends a success message to the IoT device 18 granting access to the wireless network, wherein the IoT device 18 transmits the IoT device ID to the router 512 for subsequent connection without a need for the network password, the mobile device 16 or the proxy applications 324A and 324B (block 624).

Methods and systems for one-time wireless authentication of an IoT device have been described. Methods and systems facilitate easy wireless Internet conductivity for an IoT device when there is no available means for manual entry of passwords from the IoT device, thus eliminating the need for keys and user interaction through the IoT device 18. The methods and systems facilitate IoT devices having no provisions for password entry to connect to the Internet of long as the IoT devices are pre-configured for proxy authentication using one or more mobile application and in addition to software changes in the router.

Figure 7:
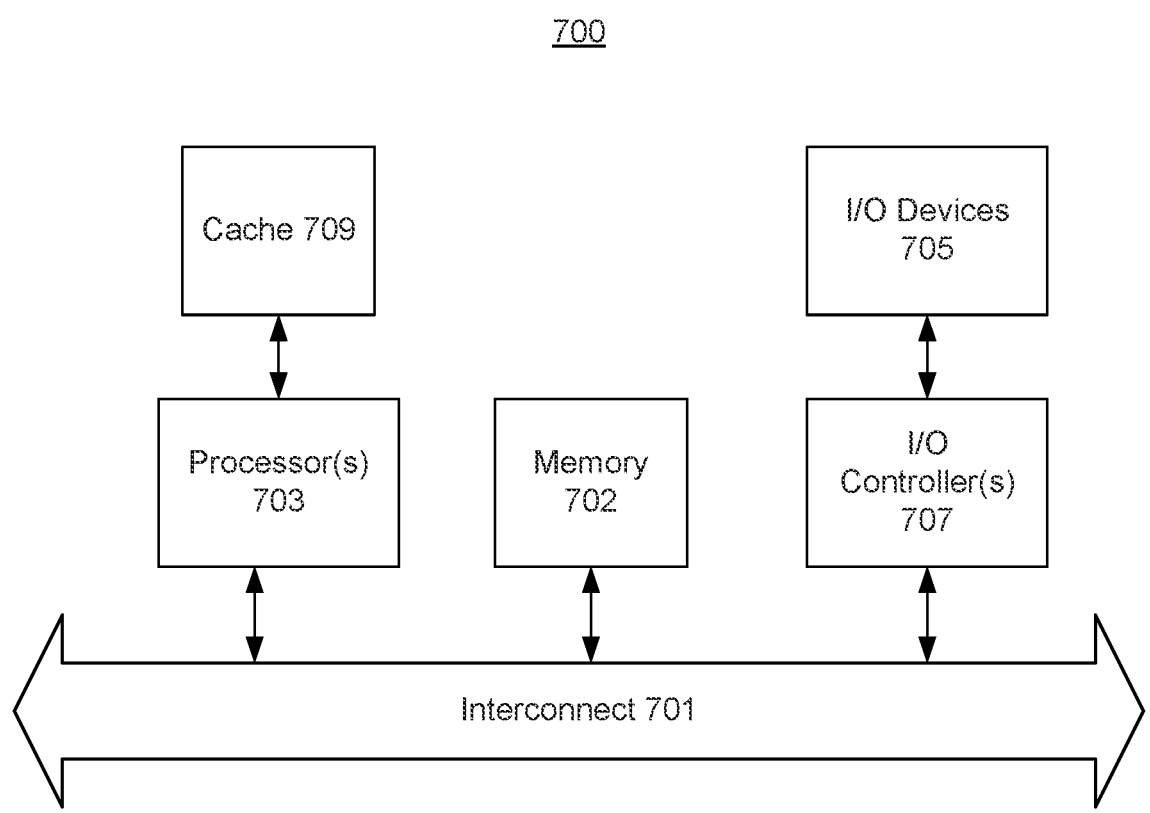
FIG. 7 shows an implementation of a computer system that may be applicable to IoT device, the mobile device, the authentication mapping server and/or the router mapper system.

FIG. 7 shows an implementation of a computer system 700 that may be applicable to IoT device 18, the mobile device 16, the authentication mapping server 26 and/or the router mapper system 504. According to an embodiment. The computer system 700 can include a microprocessor(s) 703 and memory 702. In an embodiment, the microprocessor(s) 703 and memory 702 can be connected by an interconnect 701 (e.g., bus and system core logic). In addition, the microprocessor 703 can be coupled to cache memory 709. In an embodiment, the interconnect 701 can connect the microprocessor(s) 703 and the memory 702 to input/output (I/O) device(s) 705 via I/O controller(s) 707. I/O devices 705 can include a display device and/or peripheral devices, such as mice, keyboards, modems, network interfaces, printers, scanners, video cameras and other devices known in the art. In an embodiment, (e.g., when the data processing system is a server system) some of the I/O devices (705), such as printers, scanners, mice, and/or keyboards, can be optional.

In an embodiment, the interconnect 701 can include one or more buses connected to one another through various bridges, controllers and/or adapters. In one embodiment, the I/O controllers 707 can include a USB (Universal Serial Bus) adapter for controlling USB peripherals, and/or an IEEE-1394 bus adapter for controlling IEEE-1394 peripherals.

In an embodiment, the memory 702 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DV D RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

Methods and systems for one-time wireless authentication of an Internet-of-Things device has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method for enabling wireless connectivity through a router of a wireless network for an Internet-of-Things (IoT) device, comprising:
    displaying to a user, by a proxy application executing on a mobile device, an option for the user to begin a one-time network authentication for the IoT device that lacks a user interface and is not yet configured to access the router;
    responsive to the user accepting the option, initiating, by the proxy application, a registration process and receiving a device identifier associated with the IoT device entered into the proxy application by the user of the mobile device, wherein the device identifier comprises at least one of a serial number, a partial serial number, or a key, and wherein functionality of the proxy application is separated into an application pair including a first proxy application and a second proxy application, wherein the first proxy application or the second proxy application associates the device identifier with an application identifier used to identify the first proxy application or the second proxy application;
    transmitting, by the proxy application, the device identifier to the router as part of the registration process, resulting in the router storing the device identifier in a credential management system and enabling a proxy authentication setting for the router;
    subsequent to the registration process, receiving by the proxy application, the device identifier from the router in response to the router receiving an authorization request from the IoT device for a first-time access to the wireless network, the authorization request comprising the device identifier with no network password, and the router forwarding the device identifier to the proxy application after determining that the router has proxy authentication enabled based on the device identifier and the proxy authentication setting;
    prompting, by the proxy application, the user of the mobile device to enter the network password, and transmitting the network password in a message to the router, such that in response the router validates the network password and grants the IoT device access to the wireless network; and
    wherein responsive to the IoT device becoming disconnected from the first-time access to the wireless network, the IoT device resends the device identifier to the router for a second-time access to the wireless network, and wherein in response, the router looks up the device identifier in the credential management system, and if found reestablishes access to the wireless network for the IoT device without a need for another network authentication through the mobile device or the proxy application.

2. The computer-implemented method of claim 1, wherein the registration process further comprises: registering, by the first proxy application, a mapping of the device identifier to the application identifier as an identifier pair with the router.

3. The computer-implemented method of claim 2, wherein the registration process further comprises: sending, by the first proxy application, the identifier pair to the router such that the router stores the identifier pair in a credential management system or forwards the identifier pair to an authentication mapper server.

4. The computer-implemented method of claim 2, wherein during the registration process, the identifier pair is registered with an authentication mapper server.

5. The computer-implemented method of claim 4, further comprising: configuring the authentication mapper server to communicate requests and responses for the first proxy application and the second proxy application.

6. The computer-implemented method of claim 5, further comprising: configuring the first proxy application to receive from the router the device identifier of the IoT device and determine if the IoT device has been enabled for proxy authentication by forwarding the device identifier to the authentication mapper server to validate the device identifier.

7. The computer-implemented method of claim 5, further comprising: configuring the second proxy application to prompt the user of the mobile device to enter the network password in response to receiving a validation message from the authentication mapper server, and transmit the network password in the message to the router through the authentication mapper server and the first proxy application.

8. The computer-implemented method of claim 7, further comprising:
    registering a mapping between the first application identifier and the network password with a router mapper system; and
    registering the second application identifier with an authentication mapper server.

9. The computer-implemented method of claim 1, further comprising: associating the first proxy application with a first application identifier and the second proxy application with a second application identifier, wherein the first application identifier and the second application identifier include a mobile phone number of the mobile device.

10. The computer-implemented method of claim 1, wherein receiving, by the proxy application, the device identifier associated with the IoT device further comprises: automatically determining, by the IoT device, which one of a plurality of detected wireless networks to request access to by selecting the wireless network having a highest signal strength.

11. A system for enabling wireless connectivity through a router of a wireless network, comprising:
    the router;
    an Internet-of-Things (IoT) device requiring first-time access to the wireless network, the IoT device lacking a user interface and is not yet configured to access the router, the IoT device associated with a device identifier; and
    a proxy application executing on a mobile device of a user, the proxy application to act a proxy for the IoT device during a first network authentication attempt with the router, wherein functionality of the proxy application is separated into an application pair including a first proxy application and a second proxy application, the proxy application configured to:
        display to a user an option for the user to begin a one-time network authentication for the IoT device;

responsive to the user accepting the option, initiate a registration process and receive during a registration process, the device identifier associated with the IoT device, the device identifier entered into the proxy application by the user of the mobile device, wherein the device identifier comprises at least one of a serial number, a partial serial number, or a key, and wherein the first proxy application or the second proxy application associates the device identifier with an application identifier used to identify the first proxy application or the second proxy application;

transmit the device identifier to the router as part of the registration process, resulting in the router storing the device identifier in a credential management system and enabling a proxy authentication setting for the router;

subsequent to the registration process, receive by the proxy application, the device identifier from the router in response to the router receiving an authorization request from the IoT device for a first-time access to the wireless network, the authorization request comprising the device identifier with no network password, and the router forwarding the device identifier to the proxy application after determining that the router has proxy authentication enabled based on the device identifier and the proxy authentication setting; and prompt the user of the mobile device to enter the network password, and transmit the network password in a message to the router, such that in response the router validates the network password and grants the IoT device access to the wireless network; and wherein responsive to the IoT device becoming disconnected from the first-time access to the wireless network, the IoT device resends the device identifier to the router for a second-time access to the wireless network without a need for another network authentication through the mobile device or the proxy application.

12. The system of claim 11, further comprising an authentication mapper server in communication with the router, and wherein the authentication mapper server stores a mapping between a first application identifier associated with the first proxy application, and a second application identifier associated with the second proxy application.

* * * * *